(12) United States Patent
Onggosanusi et al.

(10) Patent No.: US 9,042,480 B2
(45) Date of Patent: *May 26, 2015

(54) PRECODING CODEBOOK DESIGN FOR SINGLE USER MIMO

(71) Applicant: Texas Instruments Incorporated, Dallas, TX (US)

(72) Inventors: Eko N. Onggosanusi, Allen, TX (US); Badri N. Varadarajan, Dallas, TX (US); Runhua Chen, Dallas, TX (US); Zukang Shen, Allen, TX (US); Tarik Muharemovic, Forest Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/864,764

(22) Filed: Apr. 17, 2013

(65) Prior Publication Data

US 2013/0230118 A1    Sep. 5, 2013

Related U.S. Application Data

(63) Continuation of application No. 12/710,145, filed on Feb. 22, 2010, now Pat. No. 8,451,932.

(60) Provisional application No. 61/301,909, filed on Feb. 5, 2010, provisional application No. 61/242,274, filed on Sep. 14, 2009, provisional application No. 61/219,212, filed on Jun. 22, 2009, provisional application No. 61/219,230, filed on Jun. 22, 2009, provisional application No. 61/181,474, filed on May 27, 2009, provisional application No. 61/172,529, filed on Apr. 24, 2009, provisional application No. 61/154,676, filed on Feb. 23, 2009.

(51) Int. Cl.
*H04B 15/00*    (2006.01)
*H04B 7/04*    (2006.01)
*H04B 7/06*    (2006.01)
*H04L 27/34*    (2006.01)
*H04L 27/26*    (2006.01)

(52) U.S. Cl.
CPC ............ *H04B 7/0456* (2013.01); *H04B 7/0426* (2013.01); *H04B 7/0617* (2013.01); *H04L 27/2601* (2013.01); *H04L 27/34* (2013.01); *H04B 7/0465* (2013.01); *H04B 7/0469* (2013.01); *H04B 7/0478* (2013.01)

(58) Field of Classification Search
USPC ......... 375/130, 132, 133, 135–136, 259–261, 375/267, 271, 279, 284, 285, 295–299, 316, 375/346–35, 346–350
See application file for complete search history.

(56) References Cited

U.S. PATENT DOCUMENTS

| | | | | |
|---|---|---|---|---|
| 2005/0254587 A1* | 11/2005 | Kim et al. | | 375/260 |
| 2010/0039928 A1* | 2/2010 | Noh et al. | | 370/210 |
| 2010/0208838 A1* | 8/2010 | Lee et al. | | 375/267 |
| 2011/0096859 A1* | 4/2011 | Kim et al. | | 375/267 |

* cited by examiner

*Primary Examiner* — Sam K Ahn
*Assistant Examiner* — James M Perez
(74) *Attorney, Agent, or Firm* — Ronald O. Neerings; Frank D. Cimino

(57) ABSTRACT

A transmitter is for use with multiple transmit antennas and includes a precoder unit configured to precode data for a transmission using a precoding matrix selected from a codebook, wherein the codebook corresponds to the following three transmission properties for an uplink transmission: 1) all precoding elements from the precoding matrix have a same magnitude, 2) each precoding element from the precoding matrix is taken from a set of finite values and 3) there is only one non-zero element in any row of the precoding matrix. The transmitter also includes a transmit unit configured to transmit the precoded data.

8 Claims, 13 Drawing Sheets

PRECODING CODEBOOK DESIGN FOR SINGLE USER MIMO

CROSS-REFERENCE TO PROVISIONAL APPLICATION

This application claims the benefit of U.S. Provisional Application No. 61/154,676, filed by Eko N. Onggosanusi, Badri Varadarajan, Runhua Chen and Zukang Shen on Feb. 23, 2009, entitled "Precoding Codebook Design With Low Power Rating" commonly assigned with this application and incorporated herein by reference.

This application also claims the benefit of U.S. Provisional Application No. 61/172,529, filed by Eko N. Onggosanusi, Badri Varadarajan, Runhua Chen and Zukang Shen on Apr. 24, 2009, entitled "Progressing On 4Tx Codebook Design For Uplink SU-MIMO" commonly assigned with this application and incorporated herein by reference.

This application additionally claims the benefit of U.S. Provisional Application No. 61/181,474, filed by Eko N. Onggosanusi, Badri Varadarajan, Runhua Chen and Zukang Shen on May 27, 2009, entitled "4Tx Codebook For Uplink SU-MIMO: Cubic Metric (CM) Preserving Design" commonly assigned with this application and incorporated herein by reference.

This application further claims the benefit of U.S. Provisional Application No. 61/219,212, filed by Eko N. Onggosanusi, Badri Varadarajan, Runhua Chen, Zukang Shen and Tarik Muharemovic on Jun. 22, 2009, entitled "4Tx Codebook For Uplink SU-MIMO: Cubic Metric (CM) Preserving Design" commonly assigned with this application and incorporated herein by reference.

This application yet further claims the benefit of U.S. Provisional Application No. 61/219,230, filed by Eko N. Onggosanusi, Badri Varadarajan, Runhua Chen, Zukang Shen and Tarik Muharemovic on Jun. 22, 2009, entitled "4Tx Codebook For Uplink SU-MIMO: Rank 3" commonly assigned with this application and incorporated herein by reference.

This application still further claims the benefit of U.S. Provisional Application No. 61/242,274, filed by Eko N. Onggosanusi, Badri Varadarajan, Runhua Chen, Zukang Shen and Tarik Muharemovic on Sep. 14, 2009, entitled "4Tx Codebook For Uplink SU-MIMO: Cubic Metric (CM) Preserving Design" commonly assigned with this application and incorporated herein by reference.

This application additionally further claims the benefit of U.S. Provisional Application No. 61/301,909, filed by Eko N. Onggosanusi, Badri Varadarajan, Runhua Chen, Zukang Shen and Tarik Muharemovic on Feb. 5, 2009, entitled "4Tx Codebook For Uplink SU-MIMO: Cubic Metric (CM) Preserving Design" commonly assigned with this application and incorporated herein by reference.

TECHNICAL FIELD

The present disclosure is directed, in general, to a communication system and, more specifically, to a transmitter, a receiver and methods of operating a transmitter and a receiver.

BACKGROUND

Multiple-input, multiple-output (MIMO) communication systems provide large increases in throughput due to their ability to support multiple, parallel data streams. These data streams are each transmitted from different spatial transmission layers, which employ either physical or virtual antennas.

Generally, MIMO transmissions employ one or more parallel spatial streams that are forward error correction (FEC) encoded employing codewords. Each stream or codeword is then mapped to one or more transmission layers. Mapping of a single encoded stream to multiple layers may be simply achieved by distributing the encoded stream to all available layers. That is, the serial stream from the FEC encoding is converted to parallel streams on different layers. The number of spatial transmission layers employed is called the rank of the transmission.

The number of transmission layers used by a transmission may be any number up to the total number of physical antennas available. A signal on the virtual antennas is typically converted to a signal on the physical antennas by using linear precoding. Linear precoding consists of linearly combining the virtual antenna signals to obtain the actual signals to be transmitted. The effectiveness of a MIMO communication is dependent on the particular set of possible precoders (called a codebook) that may be used in the transmission. Although many current precoding codebooks exist, further improvements would prove beneficial in the art.

SUMMARY

Embodiments of the present disclosure provide a transmitter, a receiver and methods of operating a transmitter and a receiver. In one embodiment, the transmitter is for use with multiple transmit antennas and includes a precoder unit configured to precode data for a transmission using a precoding matrix selected from a codebook, wherein the codebook corresponds to the following three transmission properties for an uplink transmission: 1) all precoding elements from the precoding matrix have a same magnitude, 2) each precoding element from the precoding matrix is taken from a set of finite values and 3) there is only one non-zero element in any row of the precoding matrix. The transmitter also includes a transmit unit configured to transmit the precoded data.

In another embodiment, the receiver includes a receive unit configured to receive precoded data from a transmitter having multiple transmit antennas. The receiver also includes a precoder selection unit configured to select a precoding matrix from a codebook, wherein the codebook corresponds to the following three transmission properties for an uplink transmission: 1) all precoding elements from the precoding matrix have a same magnitude, 2) each precoding element from the precoding matrix is taken from a set of finite values, and 3) there is only one non-zero element in any row of the precoding matrix.

In another aspect, the present disclosure provides an embodiment of the method operating a transmitter for use with multiple transmit antennas. The method includes selecting a precoding matrix from a codebook, wherein the codebook corresponds to the following three transmission properties for an uplink transmission: 1) all precoding elements from the precoding matrix have a same magnitude, 2) each precoding element from the precoding matrix is taken from a set of finite values and 3) there is only one non-zero element in any row of the precoding matrix, and transmitting the precoded data.

In yet another aspect, the present disclosure also provides an embodiment of the method of operating a receiver for use with multiple transmit antennas. The method includes receiving precoded data from a transmitter having multiple transmit antennas, and selecting a precoding matrix from a codebook, wherein the codebook corresponds to the following three transmission properties for an uplink transmission: 1) all precoding elements from the precoding matrix have a same magnitude, 2) each precoding element from the precoding matrix is taken from a set of finite values and 3) there is only one non-zero element in any row of the precoding matrix.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Figure 1:
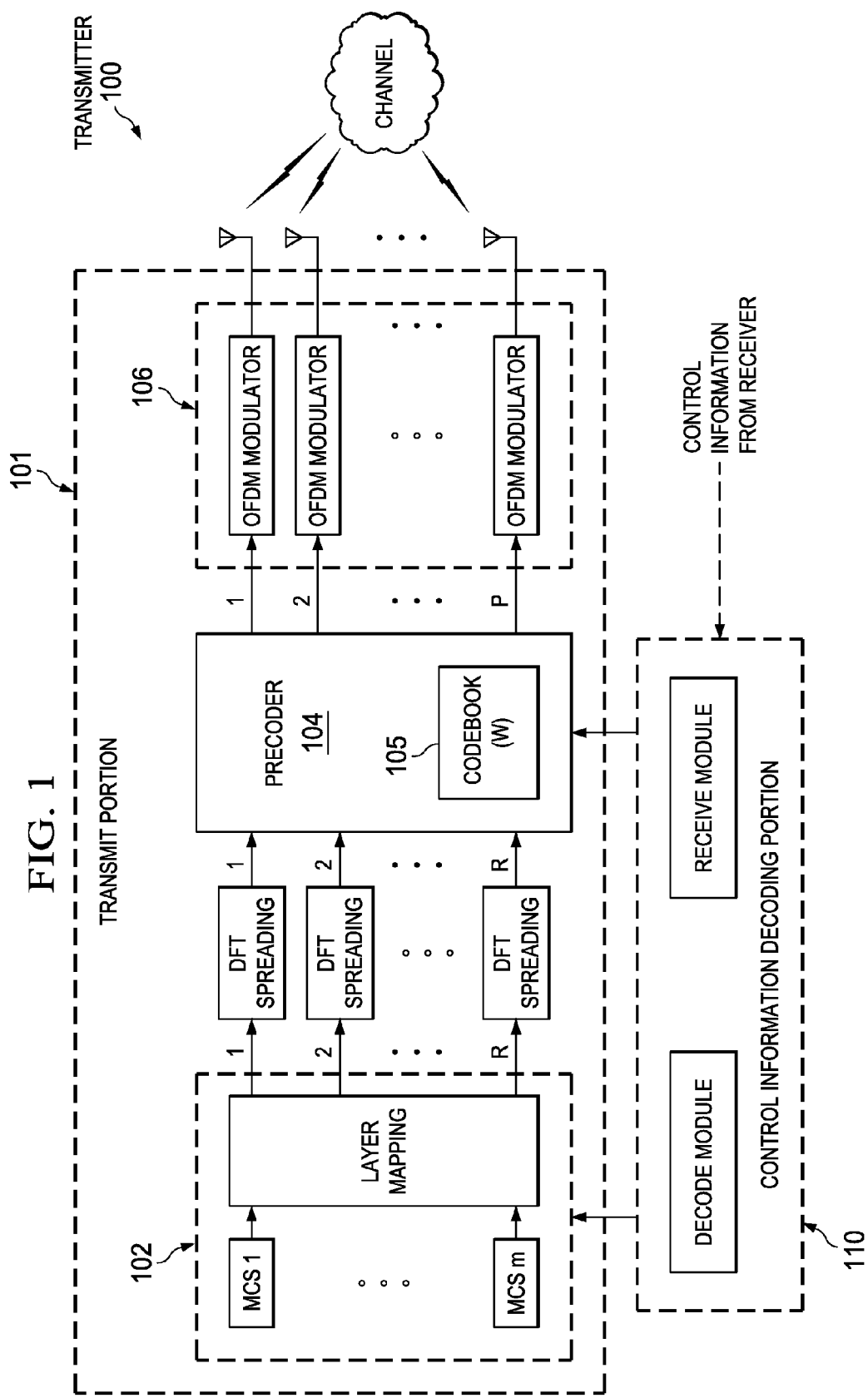
FIG. 1 illustrates a transmitter 100 as provided by one embodiment of the disclosure.

Embodiments of the present disclosure are given in the context of uplink (UL) communications although the concepts presented in this disclosure also apply for downlink communications. The embodiments employ a transmitter, which may operate in user equipment (UE) and a receiver, which may operate in a base station (eNodeB/eNB) for a cellular network. The receiver transmits a set of control information to instruct the transmitter on transmission parameters. Several transmit parameters may be adapted based on the control information from the receiver. These adaptations may include rank (the number of transmission layers) adaptation, spatial transmission stream grouping, link adaptation, and precoding adaptation.

As noted above, transmission rank is the number of spatial transmission streams or layers employed in the transmitter. The transmission rank cannot exceed the number of physical transmit antennas available for use to the transmitter. To reduce control information, it is desirable to reduce the number of spatial transmission streams (or equivalently, codewords) while maintaining the same rank. This can be done by grouping multiple virtual antennas into one spatial transmission stream. This is essentially a mapping from spatial streams to transmission layers. Link adaptation employs a modulation and coding scheme (MCS) of each spatial stream. This is determined by the channel quality indication for each spatial stream.

The current E-UTRA specification (LTE Release 8) supports single-antenna transmission only on an uplink (UL) communication. Hence, all signaling aspects are currently designed with this restriction in mind, and it is beneficial to improve this aspect of UL communications. Of particular interest is to increase the UL peak data rate by a factor of four and increase the UL spectral efficiency to meet IMT-Advanced requirements. Since 64QAM is already supported in LTE Release 8, the support of UL SU-MIMO (including spatial multiplexing) is also desirable.

For downlink (DL) SU-MIMO, codebook-based precoding has proved effective in achieving desired performance, robustness, and minimizing of signaling overhead. The following properties of a precoding codebook for DL are desirable.

(1) Property 1: Employing a constant modulus to avoid power amplifier (PA) imbalance across eNB (base station) antennas. This means that all non-zero elements of the precoder matrix or vector have the same magnitude.

(2) Property 2: Employing a finite alphabet (e.g., QPSK or 8PSK alphabet) to enable a lower complexity precoder selection at the UE (user equipment).

(3) Property 3: A nested property (i.e., any precoder of a lower rank is a sub-matrix of a precoder of a higher rank) to enable robust rank override operation at the eNB. This property can also be used to reduce the precoder search complexity. LTE Release 8 fulfills these properties for DL SU-MIMO codebooks.

For UL SU-MIMO, the following can be inferred based on the different system constraints for UL (as compared to DL).

(4) Employing Property 1 above is especially important for UL to avoid PA imbalance across the UE antennas.

(5) Employing Property 2 above is desirable to minimize precoder search complexity. Although an eNB has substantially more computing power that a UE, the eNB may perform a precoder search for all the scheduled UEs in a given subframe (TTI) with comparative ease.

(6) While property 3 above may be beneficial, it is not required for UL since rank override is not applicable (i.e., rank and precoder selection at the eNB is performed based on the channel estimate from the sounding reference signal (SRS)). This is unlike DL, which relies on RI (rank indication) and PMI (precoder matrix indication) reports.

(7) Another important property for UL is to have a low power rating (e.g., PAPR and cubic metric) for the signal on each transmit antenna. Together with property 1, this ensures that the UE power amplifiers operate efficiently by avoiding unnecessary backoff. Precoder codebook embodiments for UL SU-MIMO based on the above considerations are described in the following discussions.

FIG. 1 illustrates a transmitter 100 as provided by one embodiment of the disclosure. In general, the transmitter 100 employs a plurality P of physical antennas whereas up to four physical antennas may be used in examples discussed below. Using as an example as system compliant to the 3GPP LTE-A (Advanced E-UTRA), the transmitter 100 may operate in a DFT-precoded OFDM(A) (also termed DFT-spread OFDM (A)) communication environment although the principles of the present disclosure may be employed in other communication systems. The transmitter 100 includes a transmission portion 101 and a control information decoding portion 110. The transmission portion 101 includes a modulation, encoding and layer mapping unit 102, a precoder unit 104 and a transmit unit 106 having multiple OFDM modulators (each typically having IFFT and cyclic prefix insertion) that feed corresponding transmit antennas. Prior to layer mapping, DFT spreading is introduced to spread each of the modulated data symbols across multiple frequency sub-carriers. The control information decoding portion 110 includes a receive module and a decoder module.

Generally, the precoder unit 104 is configured to precode data for transmission using a precoding matrix selected from a codebook 105, wherein the codebook 105 corresponds to the following three transmission properties for an uplink transmission: 1) all precoding elements from the precoding matrix have a same magnitude, 2) each precoding element from the precoding matrix is taken from a set of finite values, and 3) there is only one non-zero element in any row of the precoding matrix. The transmitter also includes a transmit unit configured to transmit the precoded data. These codebooks are based on a combination of transmission properties for an uplink transmission. The transmit unit 106 is configured to transmit the precoded data.

In the illustrated embodiment, the control information decoding portion 110 recovers a control information transmission from an eNB, which is used to determine a precoding matrix index for each time-frequency resource block by the precoder unit 104. In addition, the modulation-coding scheme (MCS) and the transmission rank information are also extracted from the control information. Data are generated and encoded for each symbol stream and transmitted by the transmit unit 106, and the corresponding transmit antennas. The encoded streams are grouped by mapping one spatial stream to multiple spatial layers (in the form of virtual antennas) wherein the number of active virtual antennas is given by a transmission rank R. By performing encoding and layer mapping, the transmit signal on each transmission layer is assembled.

The precoder unit 104 employs the codebook 105 to convert the signal on the R virtual antennas to the four physical antennas. Embodiments of the precoders presented are linear. That is, the signal on each of the physical antennas is some linear combination of the signals on the virtual antennas. Thus the mapping can be specified by a linear precoding matrix. The output of the precoder unit 104 contains signals to be transmitted on the physical antennas.

In the embodiment shown, the signal is assembled in the frequency domain and converted to the time domain using the OFDM modulators, which can add a cyclic prefix to guard against channel distortion. The specific DFT-SOFDM modulation is just an example for the various kinds of modulation schemes that may be used to send the precoder unit 104 outputs on the channel. Other examples may include OFDM (A), code-division multiple access (CDMA) and time-division multiple access (TDMA) transmissions, where the signal is transmitted in the code and time domains, respectively.

Figure 2:
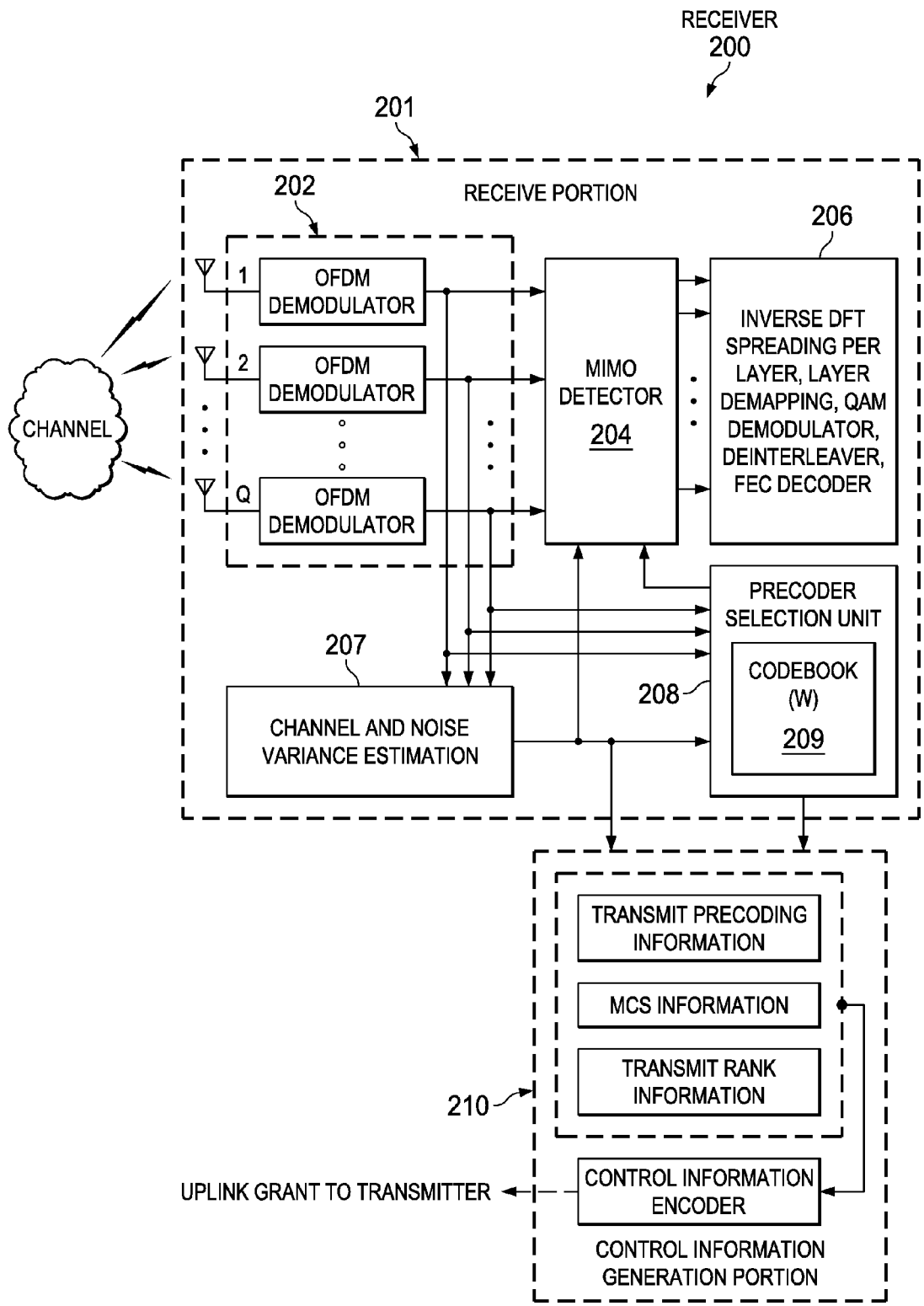
FIG. 2 illustrates a receiver 200 as provided by a corresponding embodiment of the disclosure.

FIG. 2 illustrates a receiver 200 as provided by a corresponding embodiment of the disclosure. The receiver 200 includes a receive portion 201 and a control information generation portion 210. The receive portion 201 includes a receive unit 202, a MIMO detector unit 204, a signal processing unit 206, a channel and noise variance unit 207 and a precoder selection unit 208. OFDM demodulation in the receive unit 202 is followed by channel estimation in the channel and noise variance unit 207, which enables precoder selection in the precoder selection unit 208. The precoder selection unit 208 includes a codebook 209.

Generally, the receive unit 202 is configured to receive precoded data, and the precoder selection unit 208 is configured to select a precoding matrix from the codebook 209 for the received precoded data. The codebook 209 provides codebooks corresponding to different transmission layers that are based on a combination of transmission properties for an uplink transmission.

The receiver 200 determines, among other things, a transmission rank and precoder index used by a transmitter (such as the transmitter 100) for each time-frequency resource. This may be done by decoding one or more control signals, in addition to optionally using the stored codebook 209. From the precoder index, the receiver 200 then determines the precoding matrix used from the codebook 209. This knowledge is used by the MIMO detector 204 to generate soft information for each transmission layer, which is then subsequently processed to decode the various coded streams.

The control information generation portion 210 uses channel and noise variance estimates to assemble a set of control information. In this embodiment, this includes employing a rank selector to provide a transmission rank and the precoder index information from the codebook 209 corresponding to precoding selection of the selected transmission rank. Additionally, modulation-coding scheme (MCS) for the corresponding transmission layers and coded streams is provided. These quantities are then sent to the transmitter using a control information encoder.

Different transmission ranks use different precoding codebooks. To enable the receiver 200 to correctly decode the signal, the precoding matrix in many communication systems (e.g., E-UTRA) is drawn from a finite codebook. There is a trade-off in the choice of the codebook size. Increasing the codebook size allows better tuning of the precoder matrix to improve the signal-to-interference plus noise ratio (SINR) seen by the transmission layers, and hence to increase system throughput. However, a larger codebook size also increases the amount of control information signaling to indicate the preferred or actual precoder index. Also, the eNB may need to compute an optimum precoding matrix based on channel and noise variance estimates. Referring jointly to FIGS. 1 and 2, comprehensive examples of codebooks constructed according to the principles of the present disclosure are discussed below.

Generally, the codebook designs presented fulfill the properties of (1) constant modulus, (2) finite alphabet and (3) a low power rating for the signal on each transmit antenna. The first two properties are basically straightforward to fulfill. Properties (1) and (2) imply that each of the precoder elements belongs to an M-PSK constellation. For instance, a 4-PSK (QPSK) alphabet implies that the alphabet set is $\Sigma=\{\pm 1,\pm j\}$ while an 8-PSK alphabet implies $$\Sigma = \left\{\pm 1, \pm j, \frac{\pm 1 \pm j}{\sqrt{2}}\right\}.$$

Note that an additional scaling factor may be needed to ensure the correct normalization.

As mentioned, ensuring a low power rating transmission is also desired in the codebook design. Denoting the number of transmit antennas and spatial layers as P and N, respectively, the transmitted signal can be written as shown in equation (1) below.

$$y = V_s \Rightarrow \begin{bmatrix} y_1 \\ y_2 \\ \vdots \\ y_P \end{bmatrix} \qquad (1)$$

$$= \begin{bmatrix} v_{11} & v_{12} & \cdots & v_{1N} \\ v_{21} & v_{22} & \cdots & v_{2N} \\ \vdots & \vdots & \ddots & \vdots \\ v_{P1} & v_{P2} & \cdots & v_{PN} \end{bmatrix} \begin{bmatrix} s_1 \\ s_2 \\ \vdots \\ s_N \end{bmatrix} \Rightarrow y_P$$

$$= \sum_{n=1}^{N} v_{pn} s_n, \quad \sum_{n=1}^{N} |v_{pn}|^2 = 1.$$

Here, s and V denote the transmitted QAM symbols (N-dimensional) and P×N precoding matrix, respectively.

Looking at the power of the signal on each transmit antenna and assuming statistical independence among different transmitted symbols where each has a peak power of $\rho_{MAX}$ and an average power of $\rho_{AV}$, equations (2) may be derived.

$$PeakPower = \max|y_p|^2 \qquad (2)$$

$$= \rho_{MAX} \sum_{n=1}^{N} |v_{pn}|^2 + 2 \sum_{n>n'} \operatorname{Re}\{v_{pn}^* v_{pn'} s_n^* s_{n'}\}$$

$$= \rho_{MAX}\left(1 + \frac{2}{\rho_{MAX}} \sum_{n>n'} \operatorname{Re}\{v_{pn}^* v_{pn'} s_n^* s_{n'}\}\right)$$

$$AvPower = E|y_P|^2$$

$$= \sum_{n=1}^{N} |v_{pn}|^2 E|s_n|^2$$

$$= \rho_{AV} \sum_{n=1}^{N} |v_{pn}|^2$$

$$= \rho_{AV},$$

and $$PAPR = \frac{\rho_{MAX}}{\rho_{AV}}\left(1 + \frac{2}{\rho_{MAX}} \sum_{n>n'} \operatorname{Re}\{v_{pn}^* v_{pn'} s_n^* s_{n'}\}\right)$$

$$= PAPR_{N=1}\left(1 + \frac{2}{\rho_{MAX}} \sum_{n>n'} \operatorname{Re}\{v_{pn}^* v_{pn'} s_n^* s_{n'}\}\right)$$

Note that the condition in equation (1) is automatically satisfied for N=1 since there are only one non-zero term of $v_{pn}$ for a given p.

Now consider a single-stream power rating for 2≤N≤P. It is may be noted from equations (2) that the peak-to-average power ratio (PAPR) tends to be higher compared to N=1 unless the second term in the bracket is zero for all p=1, 2, ..., P. Hence, a condition for maintaining the same power rating as that for a single-stream transmission is shown in equation (3).

$$\frac{2}{\rho_{MAX}} \sum_{n>n'} \operatorname{Re}\{v_{pn}^* v_{pn'} s_n^* s_{n'}\} = 0, \; p = 1, 2, \ldots, P \qquad (3)$$

Since the condition in equation (3) has to be valid for all possible values of $s_n^* s_{n'}$, which may take a large number of values, a necessary and sufficient condition for equation (3) is shown in equation (4).

$$v_{pn}^* v_{pn'} = 0 \text{ for } n \neq n', p = 1,2,\ldots,P \qquad (4)$$

Hence, the condition of equation (4) allows only one non-zero term of $v_{pn}$ for a given p for N>1. For P=4, the precoding matrix that satisfies this constraint may be written in the form given in equations (5) below.

$$N = 2: \prod_{4\times 4} \begin{bmatrix} \exp(j\theta_1) & 0 \\ \exp(j\theta_2) & 0 \\ 0 & \exp(j\theta_3) \\ 0 & \exp(j\theta_4) \end{bmatrix}, \qquad (5)$$

$$N = 3: \prod_{4\times 4} \begin{bmatrix} \exp(j\theta_1) & 0 & 0 \\ 0 & \exp(j\theta_2) & 0 \\ 0 & 0 & \exp(j\theta_3) \\ 0 & 0 & \exp(j\theta_4) \end{bmatrix}, \text{ and}$$

$$N = 4: \prod_{4\times 4} \begin{bmatrix} \exp(j\theta_1) & 0 & 0 & 0 \\ 0 & \exp(j\theta_2) & 0 & 0 \\ 0 & 0 & \exp(j\theta_3) & 0 \\ 0 & 0 & 0 & \exp(j\theta_4) \end{bmatrix}.$$

Here, $\Pi_{4\times 4}$ is a 4×4 permutation or ordering matrix which represents one of the 4!=24 possible permutations or orderings. Two examples that represent ordering (1,2,4,3) and (1,3,2,4) are shown in equation (6) below.

$$\begin{bmatrix} 1 & 0 & 0 & 0 \\ 0 & 1 & 0 & 0 \\ 0 & 0 & 0 & 1 \\ 0 & 0 & 1 & 0 \end{bmatrix}, \begin{bmatrix} 1 & 0 & 0 & 0 \\ 0 & 0 & 1 & 0 \\ 0 & 1 & 0 & 0 \\ 0 & 0 & 0 & 1 \end{bmatrix} \qquad (6)$$

The phase values $\{\theta_1, \theta_2, \theta_3, \theta_4\}$ can be further restricted, for example, with $\theta_1 = \theta_3 = 0$.

Based on the structures in equations (5), a codebook can be designed for each of the values of N∈{2,3, ..., P}. The codebook may be designed to maximize the precoding performance based on one or more criteria such as maximizing the minimum chordal or the Fubini-Study distance. Note that the codebook can be designed by combining the structure in equation (5) with some other structures.

Now consider a limited power rating for 2≤N≤P. While the designs considered for a single-stream power rating where 2≤N≤P allow a same power rating as that for N=1 (single-stream precoding), the structure given in equation (5) may be too limiting. Furthermore, it may be noted that the PAs in the UE may not be power-limited for N>1, although in some designs, it is possible to operate the PAs near the back-off region for improved efficiency. In this case, a better performing codebook (e.g., having a better distance property) may be obtained by relaxing the condition of a single-stream power rating.

As an example, the condition in Equation (3) may be modified as follows:

$$\frac{2}{\rho_{MAX}} \sum_{n>n'} \text{Re}\{v_{pn}^* v_{pn'} s_n^* s_{n'}\} \leq K, \; p = 1, 2, \ldots, P. \quad (7)$$

Here, K is chosen to limit the PAPR increase over that for N=1. Analogous to the single-stream power rating condition, the condition in equation (7) may be achieved by allowing only a smaller number (Q(N)) of non-zero terms of $v_{pn}$ for a given p. For instance, when P=4 and Q=2 there is no particular restriction for N=2. The precoding matrix for N equal to 3 or 4 can be written as follows.

$$N = 3: \prod_{4 \times 4} \begin{bmatrix} \exp(j\theta_{11}) & \exp(j\theta_{12}) & 0 \\ \exp(j\theta_{21}) & \exp(j\theta_{22}) & 0 \\ 0 & 0 & \exp(j\theta_{33}) \\ 0 & 0 & \exp(j\theta_{43}) \end{bmatrix}, \text{ and} \quad (8)$$

$$N = 4: \prod_{4 \times 4} \begin{bmatrix} \exp(j\theta_{11}) & \exp(j\theta_{12}) & 0 & 0 \\ \exp(j\theta_{21}) & \exp(j\theta_{22}) & 0 & 0 \\ 0 & 0 & \exp(j\theta_{33}) & \exp(j\theta_{34}) \\ 0 & 0 & \exp(j\theta_{43}) & \exp(j\theta_{44}) \end{bmatrix}.$$

The parameter definition shown in equations (8) is analogous to the single-stream power rating for $2 \leq N \leq P$. The example in equations (8) may be treated as a block diagonal structure where the transmit antenna array is divided into several antenna subsets (e.g., antenna ports 0 and 1 in one subset, and antenna ports 2 and 3 in the other subset, where the symbol-to-antenna mapping within one subset is the same and the size of each antenna subset is two). Apart from the exemplary design shown in equations (8), it is also possible to adaptively configure the number of antenna subsets l and the size of the $i^{th}$ subset ($L_i$) such that $$\sum_{i=1}^{l} L_i = P.$$

For instance, one alternative design is shown in equations (9), where l=4 and $L_i=1$ for i=1, ..., 4.

$$N = 3: \prod_{4 \times 4} \begin{bmatrix} \exp(j\theta_{11}) & \exp(j\theta_{12}) & 0 \\ \exp(j\theta_{21}) & 0 & \exp(j\theta_{23}) \\ 0 & \exp(j\theta_{32}) & 0 \\ 0 & 0 & \exp(j\theta_{43}) \end{bmatrix}, \text{ and} \quad (9)$$

$$N = 4: \prod_{4 \times 4} \begin{bmatrix} \exp(j\theta_{11}) & \exp(j\theta_{12}) & 0 & 0 \\ \exp(j\theta_{21}) & 0 & \exp(j\theta_{23}) & 0 \\ 0 & \exp(j\theta_{32}) & 0 & \exp(j\theta_{34}) \\ 0 & 0 & \exp(j\theta_{43}) & \exp(j\theta_{44}) \end{bmatrix}.$$

Multi-rank (Rank-2 and Rank-3) precoding may increase the cubic metric (CM) of a transmitted signal. Hence, minimizing a resulting CM is beneficial for the system. It may be demonstrated that a performance difference between a CM-preserving (block diagonal) codebook and a DL Householder codebook is small for lower transmit correlation, but larger for higher transmit correlation. At the same time, a reduction in UE transmit power due to PA backoff needs to be taken into account, especially in power-limited scenarios (e.g., at a cell-edge).

While preserving the CM seems attractive, the following factors are to be considered. First, imposing a CM-preserving criterion restricts the codebook structure. This amounts to introducing a number of zero components. This degrades the distance property of the codebook, which in turn, reduces the potential precoding gain. Second, power limitation is perhaps more relevant for lower-rank transmission (e.g., for UEs on the cell-edge). In this scenario, a UE is more likely to transmit with peak power and hence is susceptible to PA backoff. For this scenario, CM preservation (or more generally, minimizing the CM) is clearly beneficial. While the "more power is better" principle sounds universal, it is less relevant for higher-rank transmissions. That is, the UEs that are assigned with higher ranks are less likely to be power limited. A lower rank may be identified with rank-2 while a higher-rank with rank-3, in this case.

From the above discussion, it is also possible to consider the following. For a Rank-2 codebook, impose a CM-preserving criterion and for a Rank-3 codebook, relax the CM-preserving criterion. The CM-preserving criterion generally requires an unnecessarily restrictive structure. However, it is possible to limit the amount of CM increase by utilizing a more specific structure.

More explicit codebook designs for Rank-1, Rank-2, and Rank-3 are presented below as embodiments of the present disclosure. The codebooks for different ranks are designed and optimized separately since no requirement to impose artificial relationships across different ranks exists. Concurrently, a total codebook size (Rank-1+Rank-2+Rank-3) not to exceed 63 is maintained in the examples. Clearly, a metric for codebook design selection is throughput performance. In particular, the following principles may be followed.

Since the codebooks for different ranks are independently designed, a rank-n throughput can be used to compare different rank-n codebook designs. At the same time, the throughput within a typical geometry (SNR) rank for rank-n may be considered when comparing two designs, which are better in different SNR regions.

Throughput simulation tends to be time-consuming. Therefore, for a codebook search, average mutual information may be used to approximate the average throughput. A throughput with rank adaptation can be used to evaluate the overall design. Note, however, different rank adaptation algorithms may yield different conclusions especially since the usage frequency of different ranks may be quite different for different algorithms. Another simple metric used for codebook selection is the minimum chordal distance where the chordal distance between two matrices is defined in equation (10) below.

$$d(U, V) = \frac{1}{\sqrt{2}} \|UU^H - VV^H\|_F \text{ where} \quad (10)$$

$$\|U\|_F = \|V\|_F = 1$$

This metric provides a reasonable indication of the performance in low spatial correlation. At the same time, this metric may not reflect the throughput performance for the agreed upon antenna configuration and spatial channel characteristics. For non-uniform antenna configurations such as dual-polarized arrays, the antenna element indexing is crucial since it may heavily affect the performance due to the non-uniform correlation profile.

Figure 3A:
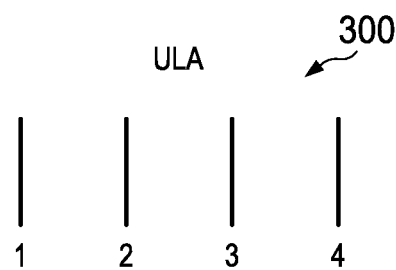
FIGS. 3A, 3B and 3C illustrate an example of transmitter element indexing for a transmitter and a receiver such as the transmitter 100 and receiver 200 shown in FIGS. 1 and 2.
Figure 3B:
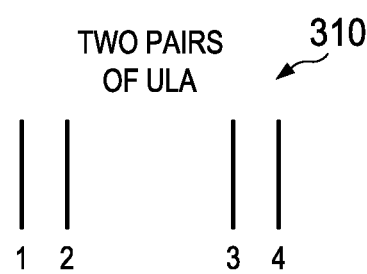
Figure 3C:
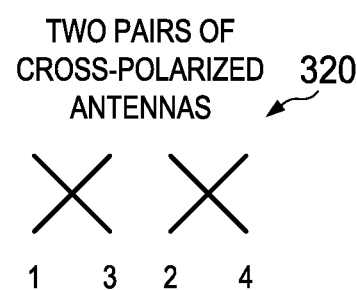
Figure 4A:
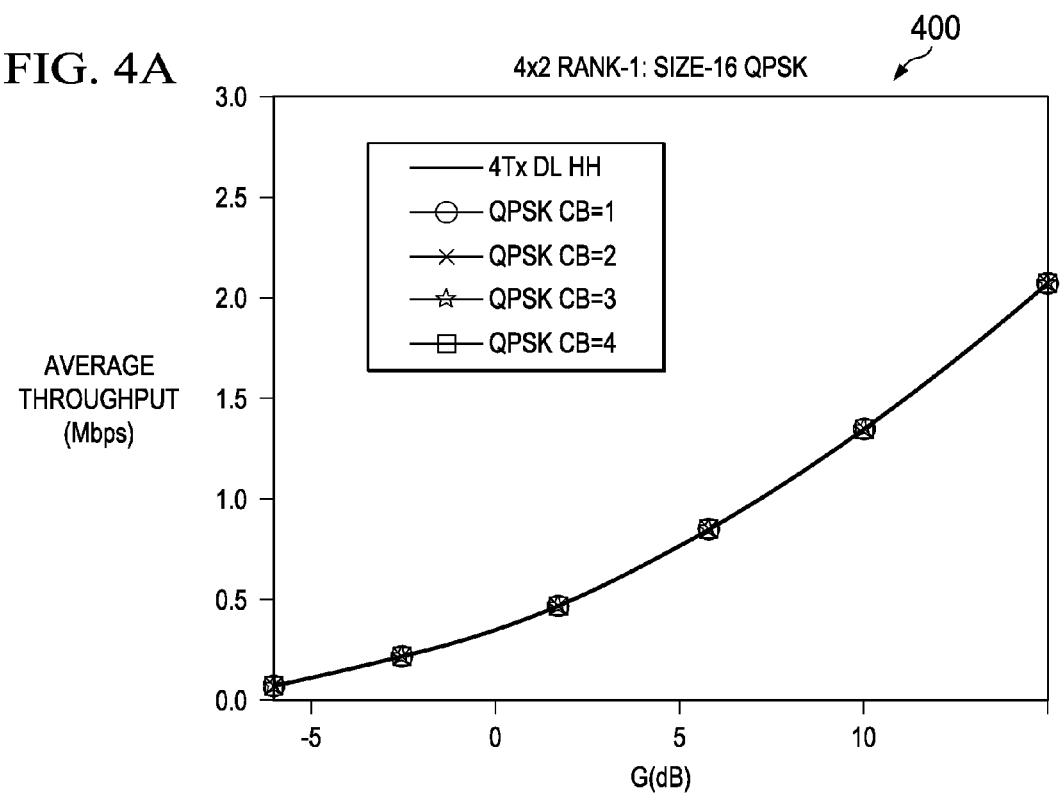
FIGS. 4A, 4B, 4C and 4D illustrate examples of performance comparisons for Rank-1 codebooks.
Figure 4B:
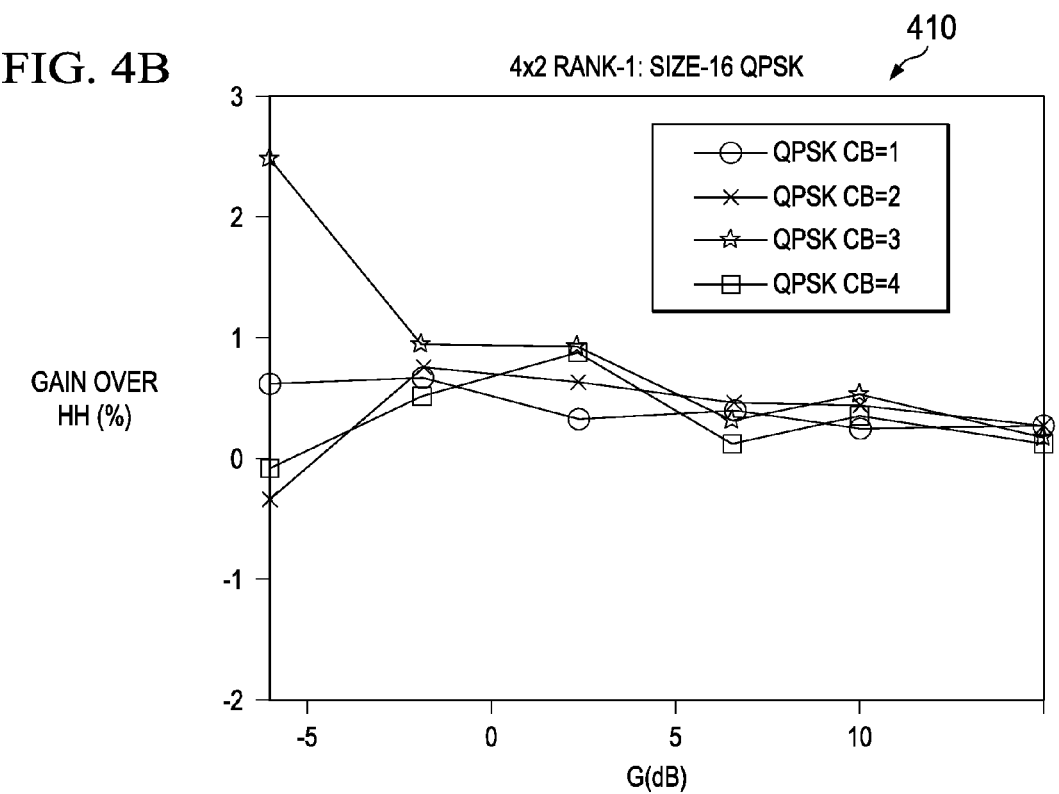
Figure 4C:
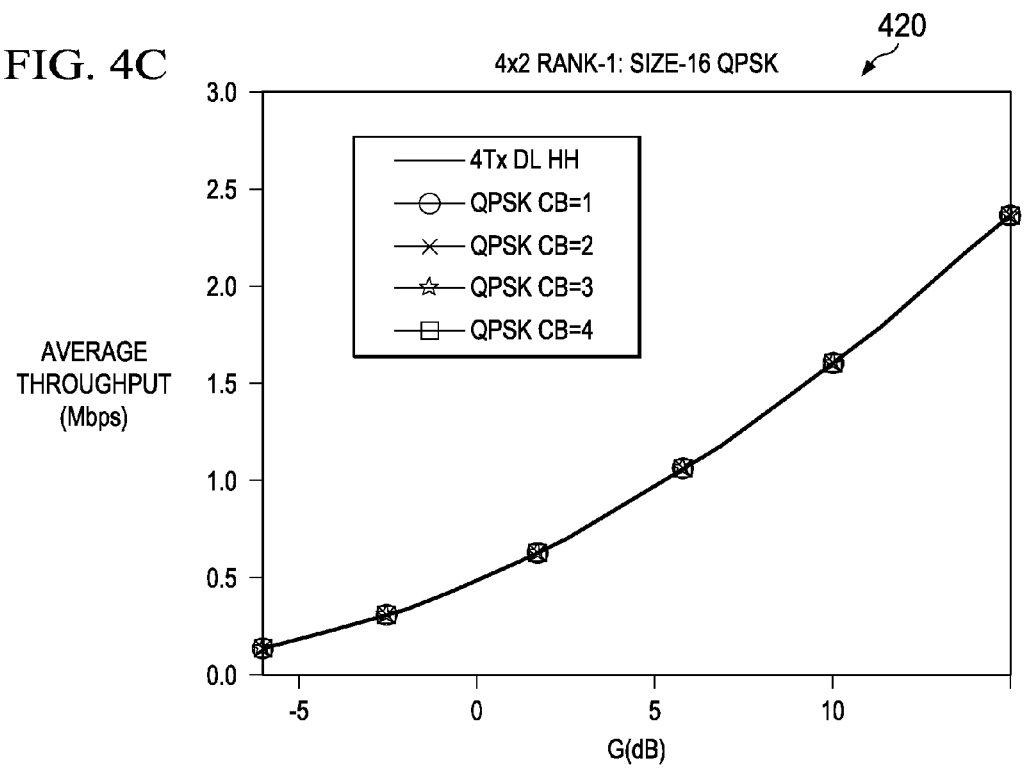
Figure 4D:
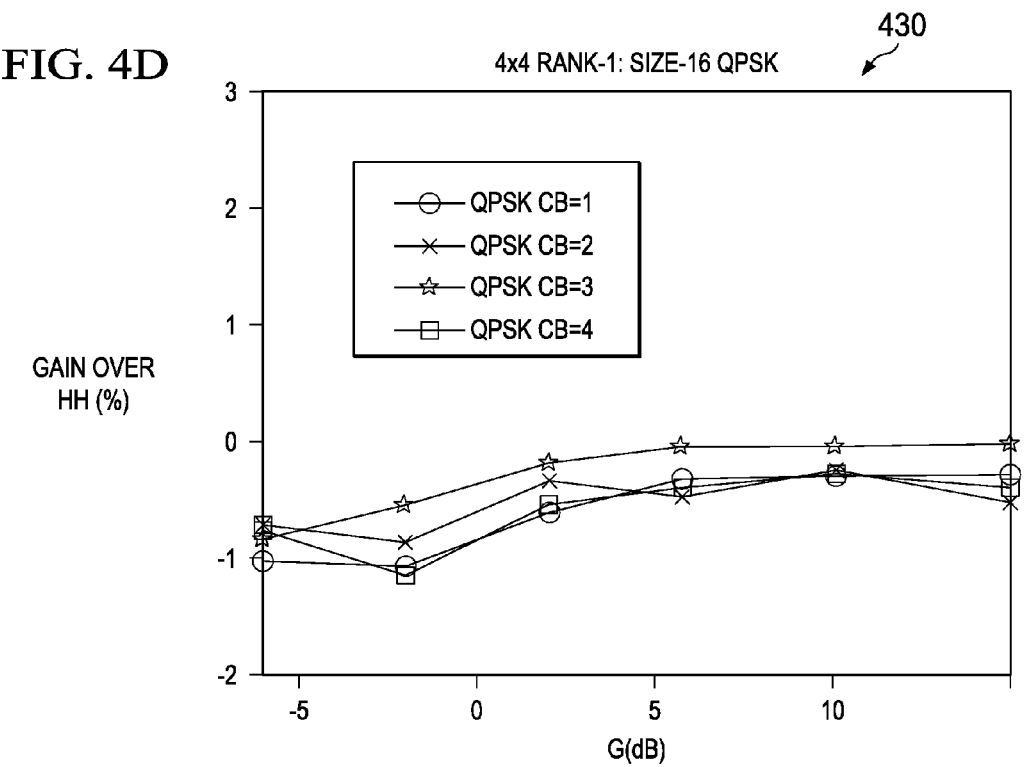
Figure 5A:
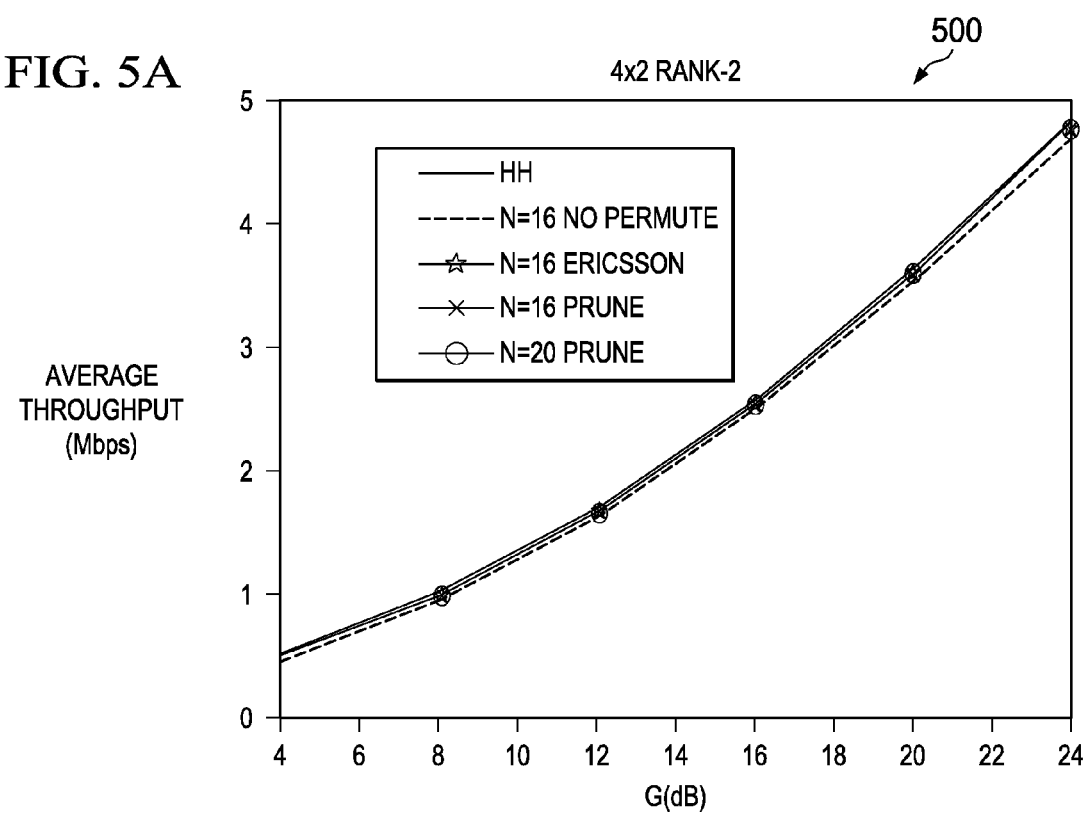
FIGS. 5A, 5B, 5C and 5D illustrate examples of performance comparisons for Rank-2 codebooks.
Figure 5B:
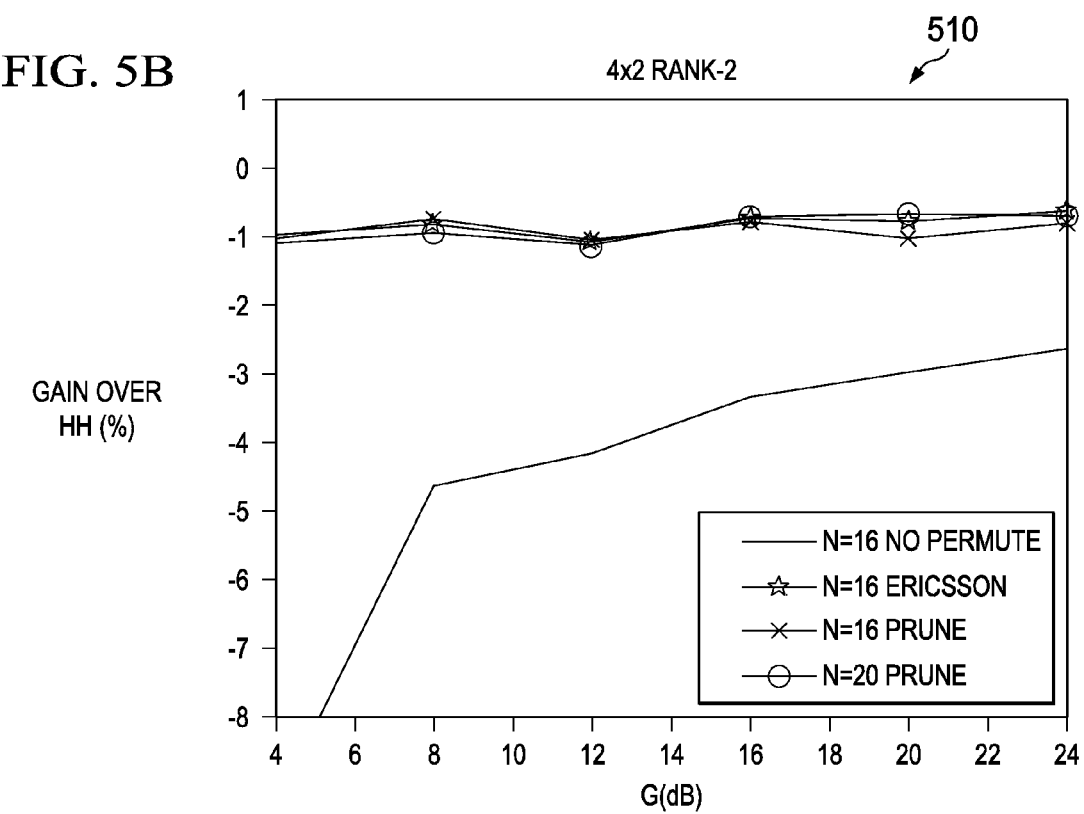
Figure 5C:
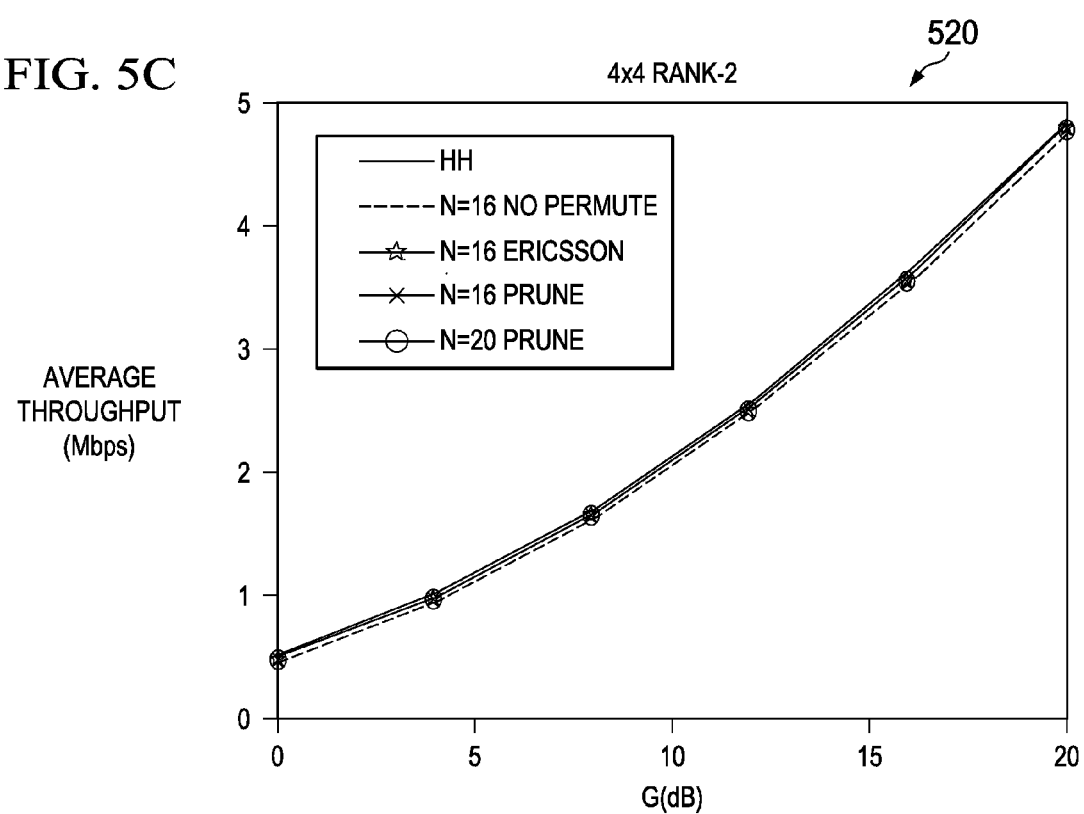
Figure 5D:
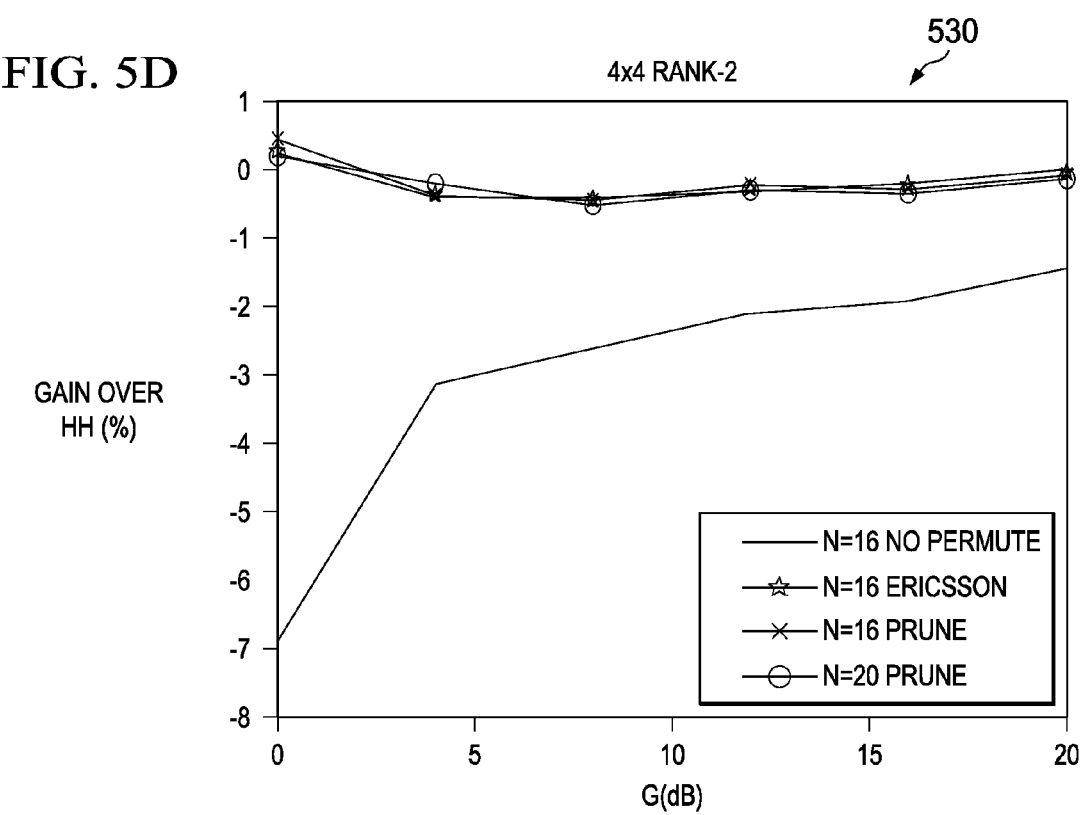

FIGS. 3A, 3B and 3C illustrate an example of transmitter element indexing for a transmitter and a receiver such as the transmitter 100 and receiver 200 shown in FIGS. 1 and 2. FIGS. 3A, 3B and 3C depict the indexing that is assumed in this disclosure. The antenna indexing is used to enumerate the spatial channel coefficients $H_{n,m}$ where n and m are the receiver and transmitter antenna indices, respectively. Observe that the indexing for the two pairs of cross-polarized antennas (FIG. 3C) represents the grouping of two antennas with the same polarization, which tend to be more correlated. This is analogous to the indexing of two pairs of uniform linear arrays (ULAs) shown in FIG. 3B.

Based on a size constraint of 64 and the need for accommodating several antenna turn-off vectors, the following codebook sizes are considered. For Rank-1, a size of 16 may be employed without antenna turn-off vectors. For Rank-2, a size of 16 or 20 may be employed. And, for Rank-3, a size of 16 may be employed. It is also assumed that a QPSK alphabet is employed, since the gain of an 8PSK alphabet over the QPSK alphabet tends to be marginal. Moreover, a QPSK-based design results in a simpler computational requirement for the precoder search.

For the case of Rank-1 codebooks, several antenna turn-off vectors are to be included in the rank-1 codebook. Additionally, assuming that four transmitter (4Tx) UL SU-MIMO is targeted for the antenna configuration shown in FIG. 3C, the following antenna group turn-off vectors shown in equation (11) are suitable along with its permutation. These may be derived from a Rank-1, two transmitter (2Tx) codebook.

$$\left\{ \frac{1}{2}\begin{bmatrix}1\\w\\0\\0\end{bmatrix}, w \in \{\pm1, \pm j\} \right\} \cup \left\{ \frac{1}{2}\begin{bmatrix}0\\0\\1\\w\end{bmatrix}, w \in \{\pm1, \pm j\} \right\}, \text{ or} \quad (11)$$

$$\left\{ \frac{1}{2}\begin{bmatrix}1\\0\\w\\0\end{bmatrix}, w \in \{\pm1, \pm j\} \right\} \cup \left\{ \frac{1}{2}\begin{bmatrix}0\\1\\0\\w\end{bmatrix}, w \in \{\pm1, \pm j\} \right\}$$

It may be unnecessary to include all eight vectors. That is, a subset of size-4 may be sufficient. Note that the antenna selection vectors are mainly aimed for power saving by turning on only one of four PAs. Hence, the scaling factor of 0.5 is introduced to reflect such an intention. Since the antenna turn-off vectors are typically not chosen in the normal precoding adaptation unless, for example, severe antenna-gain imbalance occurs.

The constant modulus vectors of the Rank-1 codebook are designed separately from the antenna turn-off vectors. That is, the antenna turn-off vectors are not included in the minimum chordal distance computation and optimization. Also, the antenna turn-off vectors are not simulated. Hence, the subsequent discussion on the Rank-1 4Tx codebook design does not include the antenna turn-off vectors.

To design a Rank-1 codebook with a QPSK alphabet, candidates with the largest minimum chordal distance are employed. By employing an efficient codebook search process (an example is provided below), it can be shown that the four codebooks in Table 1 achieve the largest minimum chordal distance. It may be observed that the four codebooks are a partition of the set of all the $4^3=64$ possible Rank-1 QPSK precoding vectors. The first, second, and third elements of the n-th precoding vector of codebooks 1, 2, 3, and 4 share the same value. The fourth element of the n-th precoding vector of codebooks 1, 2, 3, and 4 are related as $w_n^{(k)}(4) = (j)^{k-1} w_n^{(i)}(4)$, where k indicates the k-th codebook.

Table 1 illustrates Rank-1 codebooks wherein each vector is unit-norm.

TABLE 1

Rank-1 codebooks - not including antenna turn-off vectors

Size = 16

Minimum chordal distance = 0.866

Mean chordal distance = 0.893

Codebook 1

Index 0 to 7: $\frac{1}{2}\begin{bmatrix}1\\1\\1\\1\end{bmatrix}$, $\frac{1}{2}\begin{bmatrix}1\\1\\j\\-j\end{bmatrix}$, $\frac{1}{2}\begin{bmatrix}1\\1\\-1\\-1\end{bmatrix}$, $\frac{1}{2}\begin{bmatrix}1\\1\\-j\\j\end{bmatrix}$, $\frac{1}{2}\begin{bmatrix}1\\j\\1\\-j\end{bmatrix}$, $\frac{1}{2}\begin{bmatrix}1\\j\\j\\-1\end{bmatrix}$, $\frac{1}{2}\begin{bmatrix}1\\j\\-1\\j\end{bmatrix}$, $\frac{1}{2}\begin{bmatrix}1\\j\\-j\\1\end{bmatrix}$ Index 8 to 15: $\frac{1}{2}\begin{bmatrix}1\\-1\\1\\-1\end{bmatrix}$, $\frac{1}{2}\begin{bmatrix}1\\-1\\j\\j\end{bmatrix}$, $\frac{1}{2}\begin{bmatrix}1\\-1\\-1\\1\end{bmatrix}$, $\frac{1}{2}\begin{bmatrix}1\\-1\\-j\\-j\end{bmatrix}$, $\frac{1}{2}\begin{bmatrix}1\\-j\\1\\j\end{bmatrix}$, $\frac{1}{2}\begin{bmatrix}1\\-j\\j\\1\end{bmatrix}$, $\frac{1}{2}\begin{bmatrix}1\\-j\\-1\\-j\end{bmatrix}$, $\frac{1}{2}\begin{bmatrix}1\\-j\\-j\\-1\end{bmatrix}$ Codebook 2

Index 0 to 7: $\frac{1}{2}\begin{bmatrix}1\\1\\1\\j\end{bmatrix}$, $\frac{1}{2}\begin{bmatrix}1\\1\\j\\1\end{bmatrix}$, $\frac{1}{2}\begin{bmatrix}1\\1\\-1\\-j\end{bmatrix}$, $\frac{1}{2}\begin{bmatrix}1\\1\\-j\\-1\end{bmatrix}$, $\frac{1}{2}\begin{bmatrix}1\\j\\1\\1\end{bmatrix}$, $\frac{1}{2}\begin{bmatrix}1\\j\\j\\j\end{bmatrix}$, $\frac{1}{2}\begin{bmatrix}1\\j\\-1\\-1\end{bmatrix}$, $\frac{1}{2}\begin{bmatrix}1\\j\\-j\\j\end{bmatrix}$ TABLE 1-continued Rank-1 codebooks - not including antenna turn-off vectors
Size = 16
Minimum chordal distance = 0.866
Mean chordal distance = 0.893

| Index 8 to 15 | $\frac{1}{2}\begin{bmatrix}1\\-1\\1\\-j\end{bmatrix}$ | $\frac{1}{2}\begin{bmatrix}1\\-1\\j\\-1\end{bmatrix}$ | $\frac{1}{2}\begin{bmatrix}1\\-1\\-1\\j\end{bmatrix}$ | $\frac{1}{2}\begin{bmatrix}1\\-1\\-j\\1\end{bmatrix}$ | $\frac{1}{2}\begin{bmatrix}1\\-j\\1\\-1\end{bmatrix}$ | $\frac{1}{2}\begin{bmatrix}1\\-j\\j\\j\end{bmatrix}$ | $\frac{1}{2}\begin{bmatrix}1\\-j\\-1\\1\end{bmatrix}$ | $\frac{1}{2}\begin{bmatrix}1\\-j\\-j\\-j\end{bmatrix}$ |

Codebook 3

| Index 0 to 7 | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ |

| Index 8 to 15 | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ |

Codebook 4

| Index 0 to 7 | $\frac{1}{2}\begin{bmatrix}1\\1\\1\\-j\end{bmatrix}$ | $\frac{1}{2}\begin{bmatrix}1\\1\\j\\-1\end{bmatrix}$ | $\frac{1}{2}\begin{bmatrix}1\\1\\-1\\-j\end{bmatrix}$ | $\frac{1}{2}\begin{bmatrix}1\\1\\-j\\1\end{bmatrix}$ | $\frac{1}{2}\begin{bmatrix}1\\j\\1\\-1\end{bmatrix}$ | $\frac{1}{2}\begin{bmatrix}1\\j\\j\\j\end{bmatrix}$ | $\frac{1}{2}\begin{bmatrix}1\\j\\-1\\1\end{bmatrix}$ | $\frac{1}{2}\begin{bmatrix}1\\j\\-j\\-j\end{bmatrix}$ |

| Index 8 to 15 | $\frac{1}{2}\begin{bmatrix}1\\-1\\1\\j\end{bmatrix}$ | $\frac{1}{2}\begin{bmatrix}1\\-1\\j\\1\end{bmatrix}$ | $\frac{1}{2}\begin{bmatrix}1\\-1\\-1\\-j\end{bmatrix}$ | $\frac{1}{2}\begin{bmatrix}1\\-1\\-j\\-1\end{bmatrix}$ | $\frac{1}{2}\begin{bmatrix}1\\-j\\1\\1\end{bmatrix}$ | $\frac{1}{2}\begin{bmatrix}1\\-j\\j\\-j\end{bmatrix}$ | $\frac{1}{2}\begin{bmatrix}1\\-j\\-1\\-1\end{bmatrix}$ | $\frac{1}{2}\begin{bmatrix}1\\-j\\-j\\j\end{bmatrix}$ |

FIGS. 4A, 4B, 4C and 4D illustrate examples 400, 410, 420 and 430 of performance comparisons for Rank-1 codebooks. FIGS. 4A, 4B, 4C and 4D depict the comparison of the four codebooks in Table 1 relative to a 4Tx DL Householder codebook. Observe that all the codebooks perform equally well. Codebook 3 in Table 1 performs slightly better than the rest.

While a typical random search process may serve the purpose, it tends to be inefficient. In a more efficient codebook search process, as mentioned above, a searching mechanism prunes off unwanted matrices for a given starting matrix. The end result depends on a pruning order. Such a pruning-based algorithm may be described as follows.

(1) Generate all the N candidate matrices {W(n),n=1,2, ..., N}. For instance, for a 4Tx Rank-1 codebook employing a QPSK alphabet, N=64. Index the N matrices as follows: i=1,2,..., N.
(2) Generate the N×N (inter-matrix) chordal distance matrix C.
(3) Choose a particular chordal distance threshold Th.
(4) Choose a starting index i_start.
(5) Look at C(i_start,:) and remove the matrices with a chordal distance from W(i_start) less than Th. This yields a survivor set.
(6) Select one of the surviving indices i_surv via randomized or predetermined ordering (e.g., a trajectory pattern of i_surv traversing all the survivors). Look at C(i_surv,:) and remove the matrices with chordal distance from W(i_surv) less than Th. Update the survivor set.
(7) Repeat step (6) until all the survivors are exhausted. The final survivors form a codebook with minimum chordal distance of ≥Th.
(8) Repeat steps (6) and (7) with different ordering patterns for i_surv.
(9) Repeat steps (4) to (7) with different starting indices i_start.

This procedure can be used to design codebooks for any rank and/or any size.

For the case of Rank-2 codebooks, a simple design is shown in Table 2. This fits well with the antenna configuration 320 shown in FIG. 3C. No group permutation (i.e., shuffling) is performed across physical antennas. With a QPSK alphabet, this results in a size-16 codebook. Note that phase difference across layers does not improve the distance property as well as the SINR per layer. Hence, the first non-zero coefficient associated with each layer is zero-phased. It is, of course, possible to use any alphabet size such as an 8PSK. The gain, however, is expected to be marginal if any.

Table 2 illustrates a Rank-2 codebook, where each matrix is unit-norm, and shows a simple structure that is designed based on a XPD structure.

TABLE 2

Rank-2 codebook A
Simple design without antenna group permutation
Size = 16
Minimum chordal distance = 0.3536
Mean chordal distance = 0.5047

$$w = \frac{1}{2} \begin{bmatrix} 1 & 0 \\ w_1 & 0 \\ 0 & 1 \\ 0 & w_2 \end{bmatrix}, w_n \in \{\pm 1, \pm j\}$$

Another design may be obtained by incorporating antenna group permutation. There are six possible antenna group permutations relative to the spatial channel. The permutations are
$\{(1,2,3,4),(1,3,2,4),(1,4,2,3),(2,3,1,4),(2,4,1,3)(3,4,1,2)\}$.
Notice that the last three permutations can be derived from the first three by swapping the layers. However, it may also be seen that the chordal distance is invariant to permutation or swapping across the layers.

$$\|U\Pi_1\Pi_1^H U^H - V\Pi_2\Pi_2^H V^H\|_F = \|UU^H - VV^H\|_F \text{ since } \Pi_1\Pi_1^H = 1 \quad (12)$$

Such an invariance property also holds for SINR. Hence, only three permutations need to be considered for the codebook design. They are $\{(1,2,3,4),(1,3,2,4),(1,4,2,3)\}$. In this case, all the 48 possible matrices can be written as a union of the three matrix sets as shown in equation (13).

$$\left\{ \frac{1}{2} \begin{bmatrix} 1 & 0 \\ w_1 & 0 \\ 0 & 1 \\ 0 & w_2 \end{bmatrix}, w_n \in \{\pm 1, \pm j\} \right\} \cup$$

$$\left\{ \frac{1}{2} \begin{bmatrix} 1 & 0 \\ 0 & 1 \\ w_1 & 0 \\ 0 & w_2 \end{bmatrix}, w_n \in \{\pm 1, \pm j\} \right\} \cup$$

$$\left\{ \frac{1}{2} \begin{bmatrix} 1 & 0 \\ 0 & 1 \\ 0 & w_2 \\ w_1 & 0 \end{bmatrix}, w_n \in \{\pm 1, \pm j\} \right\} \quad (13)$$

The first set corresponds to the permutation (1,2,3,4) while the second and the third correspond to (1,3,2,4) and (1,4,2,3), respectively.

While a random search may provide a good codebook, a codebook can be designed by considering the underlying precoder structure in relation to the antenna configuration as shown in FIG. 3C. The following observations can be inferred from equation (13). The chordal distance between two matrices within one set (of the three sets) can be written as equation (14).

$$d(U, V) = \frac{1}{4}\sqrt{|u_1 - v_1|^2 + |u_2 - v_2|^2} \quad (14)$$

As given in Table 2, the minimum chordal distance of the first set (of size-16) is 0.3538. From equation (14), it can be shown that there are two non-intersecting subsets of size-8 with a minimum and mean chordal distance of 0.5 and 0.5296, respectively. Also note that the minimum chordal distance of a smaller subset with more than one matrix cannot exceed 0.5, as will be shown in Table 3. This also holds for the other two sets in equation (13). The same more efficient codebook search process example described above may be employed.

The chordal distance between any matrix from one of the three sets and any other matrix from another set is 0.5. This implies the following. Two other size-8 subsets can be derived from one of the subsets in Table 3 by applying antenna group permutations (1,3,2,4) and (1,4,2,3). The three size-8 subsets can be combined to form a size-24 codebook with a minimum chordal distance of 0.5.

In total, four other size-8 subsets can be derived from subsets 1-1 and 1-2. They are 2-1, 2-2, 3-1, and 3-2. Here, the designation 1-1 indicates the first permutation (1,2,3,4) corresponding to the first subset in Table 3. For x=1 or 2, subset 2-x is derived by multiplying each of the matrices in subset 1-x with $$\begin{bmatrix} 1 & 0 & 0 & 0 \\ 0 & 0 & 1 & 0 \\ 0 & 1 & 0 & 0 \\ 0 & 0 & 0 & 1 \end{bmatrix}$$

(associated with the permutation (1,3,2,4)). Similarly, subset 3-d x is derived from subset 1-x using $$\begin{bmatrix} 1 & 0 & 0 & 0 \\ 0 & 0 & 0 & 1 \\ 0 & 1 & 0 & 0 \\ 0 & 0 & 1 & 0 \end{bmatrix}$$

(associated with the permutation (1,4,2,3)).

Furthermore, any size-24 combination across the three size-8 subsets corresponding to different antenna group permutation also results in a codebook with a minimum chordal distance of 0.5. For instance, the combination of 1-1, 2-2, and 3-1 results in a codebook with a minimum chordal distance of 0.5. There are a total of $2^3=8$ combinations. Consequently, a size-16 or size-20 codebook with a minimum chordal distance of 0.5 can be obtained by pruning any of the eight possible size-24 codebooks mentioned above. Two examples are given in Table 4 where the size-16 codebook is composed of subset 1-2 (eight matrices), four matrices from subset 2-1, and four matrices from subset 3-2. The size-20 codebook is composed of subset 1-1 (matrices), four matrices from subset 2-1 and subset 3-1 for a total of eight matrices). It may also be noted that expanding the alphabet from a QPSK to an 8PSK does not improve the distance property.

Table 3 illustrates two non-intersecting subsets of set 1 in equation (13) with a minimum chordal distance of 0.5. Table 4 illustrates Rank-2 codebooks, where each matrix is unit-norm.

TABLE 3

Subset 1-1: permutation (1, 2, 3, 4)

$$\frac{1}{2}\begin{bmatrix} 1 & 0 \\ 1 & 0 \\ 0 & 1 \\ 0 & 1 \end{bmatrix} \quad \frac{1}{2}\begin{bmatrix} 1 & 0 \\ 1 & 0 \\ 0 & 1 \\ 0 & -1 \end{bmatrix} \quad \frac{1}{2}\begin{bmatrix} 1 & 0 \\ -1 & 0 \\ 0 & 1 \\ 0 & 1 \end{bmatrix} \quad \frac{1}{2}\begin{bmatrix} 1 & 0 \\ -1 & 0 \\ 0 & 1 \\ 0 & -1 \end{bmatrix} \quad \frac{1}{2}\begin{bmatrix} 1 & 0 \\ j & 0 \\ 0 & 1 \\ 0 & j \end{bmatrix} \quad \frac{1}{2}\begin{bmatrix} 1 & 0 \\ j & 0 \\ 0 & 1 \\ 0 & -j \end{bmatrix} \quad \frac{1}{2}\begin{bmatrix} 1 & 0 \\ -j & 0 \\ 0 & 1 \\ 0 & j \end{bmatrix} \quad \frac{1}{2}\begin{bmatrix} 1 & 0 \\ -j & 0 \\ 0 & 1 \\ 0 & -j \end{bmatrix}$$

Subset 1-2: permutation (1, 2, 3, 4)

$$\frac{1}{2}\begin{bmatrix} 1 & 0 \\ 1 & 0 \\ 0 & 1 \\ 0 & j \end{bmatrix} \quad \frac{1}{2}\begin{bmatrix} 1 & 0 \\ 1 & 0 \\ 0 & 1 \\ 0 & -j \end{bmatrix} \quad \frac{1}{2}\begin{bmatrix} 1 & 0 \\ j & 0 \\ 0 & 1 \\ 0 & 1 \end{bmatrix} \quad \frac{1}{2}\begin{bmatrix} 1 & 0 \\ j & 0 \\ 0 & 1 \\ 0 & -1 \end{bmatrix} \quad \frac{1}{2}\begin{bmatrix} 1 & 0 \\ -1 & 0 \\ 0 & 1 \\ 0 & j \end{bmatrix} \quad \frac{1}{2}\begin{bmatrix} 1 & 0 \\ -1 & 0 \\ 0 & 1 \\ 0 & -j \end{bmatrix} \quad \frac{1}{2}\begin{bmatrix} 1 & 0 \\ -j & 0 \\ 0 & 1 \\ 0 & 1 \end{bmatrix} \quad \frac{1}{2}\begin{bmatrix} 1 & 0 \\ -j & 0 \\ 0 & 1 \\ 0 & -1 \end{bmatrix}$$

TABLE 4

Rank-2 codebook B.1
Allow antenna grouping permutation
Size = 16
Minimum chordal distance = 0.500
Mean chordal distance = 0.533

Index 0 to 6

$$\frac{1}{2}\begin{bmatrix} 1 & 0 \\ 1 & 0 \\ 0 & 1 \\ 0 & j \end{bmatrix} \quad \frac{1}{2}\begin{bmatrix} 1 & 0 \\ 1 & 0 \\ 0 & 1 \\ 0 & -j \end{bmatrix} \quad \frac{1}{2}\begin{bmatrix} 1 & 0 \\ j & 0 \\ 0 & 1 \\ 0 & 1 \end{bmatrix} \quad \frac{1}{2}\begin{bmatrix} 1 & 0 \\ j & 0 \\ 0 & 1 \\ 0 & -1 \end{bmatrix} \quad \frac{1}{2}\begin{bmatrix} 1 & 0 \\ -1 & 0 \\ 0 & 1 \\ 0 & j \end{bmatrix} \quad \frac{1}{2}\begin{bmatrix} 1 & 0 \\ -1 & 0 \\ 0 & 1 \\ 0 & -j \end{bmatrix} \quad \frac{1}{2}\begin{bmatrix} 1 & 0 \\ -j & 0 \\ 0 & 1 \\ 0 & 1 \end{bmatrix}$$

Index 7 to 13

$$\frac{1}{2}\begin{bmatrix} 1 & 0 \\ -j & 0 \\ 0 & 1 \\ 0 & -1 \end{bmatrix} \quad \frac{1}{2}\begin{bmatrix} 1 & 0 \\ 0 & 1 \\ 1 & 0 \\ 0 & 1 \end{bmatrix} \quad \frac{1}{2}\begin{bmatrix} 1 & 0 \\ 0 & 1 \\ 1 & 0 \\ 0 & -1 \end{bmatrix} \quad \frac{1}{2}\begin{bmatrix} 1 & 0 \\ 0 & 1 \\ -1 & 0 \\ 0 & 1 \end{bmatrix} \quad \frac{1}{2}\begin{bmatrix} 1 & 0 \\ 0 & 1 \\ -1 & 0 \\ 0 & -1 \end{bmatrix} \quad \frac{1}{2}\begin{bmatrix} 1 & 0 \\ 0 & 1 \\ 0 & j \\ 1 & 0 \end{bmatrix} \quad \frac{1}{2}\begin{bmatrix} 1 & 0 \\ 0 & 1 \\ 0 & -j \\ 1 & 0 \end{bmatrix}$$

Index 14 to 15

$$\frac{1}{2}\begin{bmatrix} 1 & 0 \\ 0 & 1 \\ 0 & j \\ -1 & 0 \end{bmatrix} \quad \frac{1}{2}\begin{bmatrix} 1 & 0 \\ 0 & 1 \\ 0 & -j \\ -1 & 0 \end{bmatrix}$$

Rank-2 codebook B.2
Allow antenna grouping permutation
Size = 20
Minimum chordal distance = 0.500
Mean chordal distance = 0.526

Index 0 to 6

$$\frac{1}{2}\begin{bmatrix} 1 & 0 \\ 1 & 0 \\ 0 & 1 \\ 0 & 1 \end{bmatrix} \quad \frac{1}{2}\begin{bmatrix} 1 & 0 \\ 1 & 0 \\ 0 & 1 \\ 0 & -1 \end{bmatrix} \quad \frac{1}{2}\begin{bmatrix} 1 & 0 \\ -1 & 0 \\ 0 & 1 \\ 0 & 1 \end{bmatrix} \quad \frac{1}{2}\begin{bmatrix} 1 & 0 \\ -1 & 0 \\ 0 & 1 \\ 0 & -1 \end{bmatrix} \quad \frac{1}{2}\begin{bmatrix} 1 & 0 \\ j & 0 \\ 0 & 1 \\ 0 & j \end{bmatrix} \quad \frac{1}{2}\begin{bmatrix} 1 & 0 \\ j & 0 \\ 0 & 1 \\ 0 & -j \end{bmatrix} \quad \frac{1}{2}\begin{bmatrix} 1 & 0 \\ -j & 0 \\ 0 & 1 \\ 0 & j \end{bmatrix}$$

Index 7 to 13

$$\frac{1}{2}\begin{bmatrix} 1 & 0 \\ -j & 0 \\ 0 & 1 \\ 0 & -j \end{bmatrix} \quad \frac{1}{2}\begin{bmatrix} 1 & 0 \\ 0 & 1 \\ 1 & 0 \\ 0 & 1 \end{bmatrix} \quad \frac{1}{2}\begin{bmatrix} 1 & 0 \\ 0 & 1 \\ 1 & 0 \\ 0 & -1 \end{bmatrix} \quad \frac{1}{2}\begin{bmatrix} 1 & 0 \\ 0 & 1 \\ -1 & 0 \\ 0 & 1 \end{bmatrix} \quad \frac{1}{2}\begin{bmatrix} 1 & 0 \\ 0 & 1 \\ -1 & 0 \\ 0 & -1 \end{bmatrix} \quad \frac{1}{2}\begin{bmatrix} 1 & 0 \\ 0 & 1 \\ 0 & 1 \\ 1 & 0 \end{bmatrix} \quad \frac{1}{2}\begin{bmatrix} 1 & 0 \\ 0 & 1 \\ 0 & -1 \\ 1 & 0 \end{bmatrix}$$

Index 14 to 19

$$\frac{1}{2}\begin{bmatrix} 1 & 0 \\ 0 & 1 \\ 0 & 1 \\ -1 & 0 \end{bmatrix} \quad \frac{1}{2}\begin{bmatrix} 1 & 0 \\ 0 & 1 \\ 0 & -1 \\ -1 & 0 \end{bmatrix} \quad \frac{1}{2}\begin{bmatrix} 1 & 0 \\ 0 & 1 \\ 0 & j \\ j & 0 \end{bmatrix} \quad \frac{1}{2}\begin{bmatrix} 1 & 0 \\ 0 & 1 \\ 0 & -j \\ j & 0 \end{bmatrix} \quad \frac{1}{2}\begin{bmatrix} 1 & 0 \\ 0 & 1 \\ 0 & j \\ -j & 0 \end{bmatrix} \quad \frac{1}{2}\begin{bmatrix} 1 & 0 \\ 0 & 1 \\ 0 & -j \\ -j & 0 \end{bmatrix}$$

FIGS. 5A, 5B, 5C and 5D illustrate examples 500, 510, 520 and 530 of performance comparisons for Rank-2 codebooks. The examples 500, 510, 520 and 530 depict throughput comparisons of the following Rank-2 codebooks.
(1) A 4Tx Householder codebook for DL MIMO Release 8.
(2) A CM-preserving codebook A (Table 2) without antenna group permutation for codebook size-16.
(3) A CM-preserving codebook B.1 (Table 3) without antenna group permutation for codebook size-16.
(4) A CM-preserving codebook B.2 (Table 3) without antenna group permutation for codebook size-20.

The rank is fixed to two for this comparison. The gain relative to the Householder codebook is also shown. The following observations may be made. Codebooks B-1 (size-16) and B-2 (size-20) perform approximately the same. Codebooks B-1 and B-2 offer significant gain over codebook A. Therefore, antenna group permutation is seen to be beneficial.

For the case of Rank-3 codebooks, a CM-preserving design is considered first. A Rank-3 CM-preserving design may be written as follows.

$$W = \frac{1}{2} \times \Pi \begin{bmatrix} 1 & 0 & 0 \\ w & 0 & 0 \\ 0 & 1 & 0 \\ 0 & 0 & 1 \end{bmatrix}. \tag{15}$$

The coefficient w belongs to an alphabet set. For instance, $w \in \{\pm 1, \pm j\}$ holds for a QPSK-based design. Other alphabet sets such as 8PSK $$\left( w \in \left\{ \pm 1, \pm j, \frac{\pm 1 \pm j}{\sqrt{2}} \right\} \right)$$

are also possible. Similar to the Rank-2 design, a codebook distance property and SINR are invariant to the phase difference across layers. Hence, the first non-zero coefficient associated with each layer is zero-phased.

The 4×4 matrix Π represents permutation or ordering operation. While there are a total of 4!=24 possible orderings, the following facts can be used to reduce the number of permutation matrices we need for codebook design.
(1) As for the Rank-2 design, the distance property and SINR are invariant to permutation across layers.
(2) Taking into account the layer mapping for the 3-layer transmission, only the first layer may be assigned with two non-zero coefficients (which corresponds to mapping onto two physical antennas). This is because the first codeword is mapped onto one layer while the second codeword is mapped onto two layers. Note that the first layer is assigned 2× power compared to the other layers.

Based on the above facts, only six permutations are considered. The set of all possible candidates can be written as shown below.

$$\left\{ \frac{1}{2}\begin{bmatrix} 1 & 0 & 0 \\ w & 0 & 0 \\ 0 & 1 & 0 \\ 0 & 0 & 1 \end{bmatrix}, \frac{1}{2}\begin{bmatrix} 1 & 0 & 0 \\ 0 & 1 & 0 \\ w & 0 & 0 \\ 0 & 0 & 1 \end{bmatrix}, \frac{1}{2}\begin{bmatrix} 1 & 0 & 0 \\ 0 & 1 & 0 \\ 0 & 0 & 1 \\ w & 0 & 0 \end{bmatrix}, \right. \tag{16}$$

$$\left. \frac{1}{2}\begin{bmatrix} 0 & 1 & 0 \\ 1 & 0 & 0 \\ w & 0 & 0 \\ 0 & 0 & 1 \end{bmatrix}, \frac{1}{2}\begin{bmatrix} 0 & 1 & 0 \\ 1 & 0 & 0 \\ 0 & 0 & 0 \\ w & 0 & 1 \end{bmatrix}, \frac{1}{2}\begin{bmatrix} 0 & 1 & 0 \\ 0 & 0 & 1 \\ 1 & 0 & 0 \\ w & 0 & 0 \end{bmatrix} \right\}$$

Each of the six permutation groups is termed a permutation set. The above structure can be used to optimize the codebook design. The chordal distance between two matrices within one permutation set (of the six sets) can be written as:

$$d(U, V) = \frac{1}{4}|u - v| \tag{17}$$

Hence, the codebook distance property is limited by the minimum distance of the alphabet set. In this case, increasing the alphabet size from QPSK and 8PSK does not improve the codebook distance property for a given codebook size. With a QPSK alphabet, $$d_{min}(U, V) = \frac{1}{4}\sqrt{2} = \frac{1}{2\sqrt{2}}.$$

The chordal distance between any matrix from one of the six sets and any other matrix from another set is $$\frac{1}{2\sqrt{2}}.$$

Assuming a QPSK alphabet, any subset of the size-24 set specified in equation (16) forms a codebook with a minimum chordal distance of $$\frac{1}{2\sqrt{2}}.$$

The following can be implied if a size-16 codebook is desired.

$$\binom{24}{16}$$

(1) There are a total of possibilities that guarantee the largest minimum chordal distance. But any of such possibilities does not necessarily maximize the mean chordal distance.

(2) A Design A is a size-16 codebook having good mean chordal distance accomplished by taking only any 4 out of 6 permutation groups. There are $$\binom{6}{4} = 15$$

of such possibilities although such chordal distance is not maximum.

(3) A Design B is another size-16 codebook having the same mean chordal distance as Design A can be obtained as follows.

(a) For 12 matrices, take two matrices with the largest distance from each of the six permutation groups. This can be easily seen from equations (16) and (17). That is (u,v)= (+1,−1) or (u,v)=(+j,−j), which results in $$d(U, V) = \frac{1}{2}.$$

Assume that (u,v)=(+1,−1) for all the six permutation groups. Otherwise there are a total of $2^6$=64 possible combinations of the two choices across the 6 permutation groups.

(b) For four matrices: Take any four matrices from the remaining 12 matrices.

There are $$\binom{12}{4} = 395$$

possibilities. However, the number of candidates can be reduced if two of the four matrices are taken from one permutation group (to complement the two previously chosen matrices) and the other two from one other permutation group. In this case, there are $$\binom{6}{2} = 15$$

possibilities.

With this construction, all the permutation sets are used. In the two of the six permutation groups all four possible precoding matrices are used. In the other four permutation groups, only two matrices are used as indicated above. Two examples of the design are given in Table 5.

Table 5 illustrates Rank-3 CM-preserving codebooks where each matrix is unit-norm.

TABLE 5

Rank-3 codebook A
Permutation groups: P1, P3, P4, P6
Size = 16
Minimum chordal distance = 0.3538
Mean chordal distance = 0.3633

| Index 0 to 3 | $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ j & 0 & 0 \\ 0 & 1 & 0 \\ 0 & 0 & 1 \end{bmatrix}$ | $\frac{1}{2}\begin{bmatrix} 1 & 0 & 0 \\ -1 & 0 & 0 \\ 0 & 1 & 0 \\ 0 & 0 & 1 \end{bmatrix}$ | $\frac{1}{2}\begin{bmatrix} 1 & 0 & 0 \\ -j & 0 & 0 \\ 0 & 1 & 0 \\ 0 & 0 & 1 \end{bmatrix}$ |
|---|---|---|---|---|
| Index 4 to 7 | $\frac{1}{2}\begin{bmatrix} 1 & 0 & 0 \\ 0 & 1 & 0 \\ 0 & 0 & 1 \\ 1 & 0 & 0 \end{bmatrix}$ | $\frac{1}{2}\begin{bmatrix} 1 & 0 & 0 \\ 0 & 1 & 0 \\ 0 & 0 & 1 \\ j & 0 & 0 \end{bmatrix}$ | $\frac{1}{2}\begin{bmatrix} 1 & 0 & 0 \\ 0 & 1 & 0 \\ 0 & 0 & 1 \\ -1 & 0 & 0 \end{bmatrix}$ | $\frac{1}{2}\begin{bmatrix} 1 & 0 & 0 \\ 0 & 1 & 0 \\ 0 & 0 & 1 \\ -j & 0 & 0 \end{bmatrix}$ |
| Index 8 to 11 | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ j & 0 & 0 \\ 0 & 0 & 1 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ | $\frac{1}{2}\begin{bmatrix} 0 & 1 & 0 \\ 1 & 0 & 0 \\ -j & 0 & 0 \\ 0 & 0 & 1 \end{bmatrix}$ |
| Index 12 to 15 | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ j & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ | $\frac{1}{2}\begin{bmatrix} 0 & 1 & 0 \\ 0 & 0 & 1 \\ 1 & 0 & 0 \\ -j & 0 & 0 \end{bmatrix}$ |

Rank-3 codebook B
Permutation groups: P1, P2, P3, P6
Size = 16
Minimum chordal distance = 0.3538
Mean chordal distance = 0.3633

| Index 0 to 5 | $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ 0 & 0 & 1 \\ 1 & 0 & 0 \end{bmatrix}$ | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ 0 & 0 & 1 \\ 1 & 0 & 0 \end{bmatrix}$ | $\frac{1}{2}\begin{bmatrix} 0 & 1 & 0 \\ 0 & 0 & 1 \\ 1 & 0 & 0 \\ 1 & 0 & 0 \end{bmatrix}$ |
|---|---|---|---|---|---|---|
| Index 6 to 11 | $\frac{1}{2}\begin{bmatrix} 1 & 0 & 0 \\ -1 & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2}\begin{bmatrix} 1 & 0 & 0 \\ 0 & 1 & 0 \\ 0 & 0 & 1 \\ -1 & 0 & 0 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ | $\frac{1}{2}\begin{bmatrix} 0 & 1 & 0 \\ 1 & 0 & 0 \\ 0 & 0 & 1 \\ -1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ |

TABLE 5-continued

Index 12 to 15

$$\frac{1}{2}\begin{bmatrix} 1 & 0 & 0 \\ j & 0 & 0 \\ 0 & 1 & 0 \\ 0 & 0 & 1 \end{bmatrix} \quad \frac{1}{2}\begin{bmatrix} 1 & 0 & 0 \\ -j & 0 & 0 \\ 0 & 1 & 0 \\ 0 & 0 & 1 \end{bmatrix} \quad \frac{1}{2}\begin{bmatrix} 1 & 0 & 0 \\ 0 & 1 & 0 \\ 0 & 0 & 1 \\ j & 0 & 0 \end{bmatrix} \quad \frac{1}{2}\begin{bmatrix} 1 & 0 & 0 \\ 0 & 1 & 0 \\ 0 & 0 & 1 \\ -j & 0 & 0 \end{bmatrix}$$

Rank-3 codebook C
Permutation groups: P1, P3, P4, P6
Size = 16
Minimum chordal distance = 0.3538
Mean chordal distance = 0.3633

Index 0 to 4

$$\frac{1}{2}\begin{bmatrix} 1 & 0 & 0 \\ 1 & 0 & 0 \\ 0 & 1 & 0 \\ 0 & 0 & 1 \end{bmatrix} \quad \frac{1}{2}\begin{bmatrix} 1 & 0 & 0 \\ j & 0 & 0 \\ 0 & 1 & 0 \\ 0 & 0 & 1 \end{bmatrix} \quad \frac{1}{2}\begin{bmatrix} 1 & 0 & 0 \\ -1 & 0 & 0 \\ 0 & 1 & 0 \\ 0 & 0 & 1 \end{bmatrix} \quad \frac{1}{2}\begin{bmatrix} 1 & 0 & 0 \\ -j & 0 & 0 \\ 0 & 1 & 0 \\ 0 & 0 & 1 \end{bmatrix} \quad \frac{1}{2}\begin{bmatrix} 1 & 0 & 0 \\ 0 & 1 & 0 \\ 0 & 0 & 1 \\ 1 & 0 & 0 \end{bmatrix} \quad \frac{1}{2}\begin{bmatrix} 1 & 0 & 0 \\ 0 & 1 & 0 \\ 0 & 0 & 1 \\ j & 0 & 0 \end{bmatrix}$$

Index 6 to 11

$$\frac{1}{2}\begin{bmatrix} 1 & 0 & 0 \\ 0 & 1 & 0 \\ 0 & 0 & 1 \\ -1 & 0 & 0 \end{bmatrix} \quad \frac{1}{2}\begin{bmatrix} 1 & 0 & 0 \\ 0 & 1 & 0 \\ 0 & 0 & 1 \\ -j & 0 & 0 \end{bmatrix} \quad \frac{1}{2}\begin{bmatrix} 0 & 1 & 0 \\ 1 & 0 & 0 \\ 1 & 0 & 0 \\ 0 & 0 & 1 \end{bmatrix} \quad \frac{1}{2}\begin{bmatrix} 0 & 1 & 0 \\ 1 & 0 & 0 \\ j & 0 & 0 \\ 0 & 0 & 1 \end{bmatrix} \quad \frac{1}{2}\begin{bmatrix} 0 & 1 & 0 \\ 1 & 0 & 0 \\ -1 & 0 & 0 \\ 0 & 0 & 1 \end{bmatrix} \quad \frac{1}{2}\begin{bmatrix} 0 & 1 & 0 \\ 1 & 0 & 0 \\ -j & 0 & 0 \\ 0 & 0 & 1 \end{bmatrix}$$

Index 12 to 15

$$\frac{1}{2}\begin{bmatrix} 0 & 1 & 0 \\ 0 & 0 & 1 \\ 1 & 0 & 0 \\ 1 & 0 & 0 \end{bmatrix} \quad \frac{1}{2}\begin{bmatrix} 0 & 1 & 0 \\ 0 & 0 & 1 \\ 1 & 0 & 0 \\ j & 0 & 0 \end{bmatrix} \quad \frac{1}{2}\begin{bmatrix} 0 & 1 & 0 \\ 0 & 0 & 1 \\ 1 & 0 & 0 \\ -1 & 0 & 0 \end{bmatrix} \quad \frac{1}{2}\begin{bmatrix} 0 & 1 & 0 \\ 0 & 0 & 1 \\ 1 & 0 & 0 \\ -j & 0 & 0 \end{bmatrix}$$

Figure 6A:
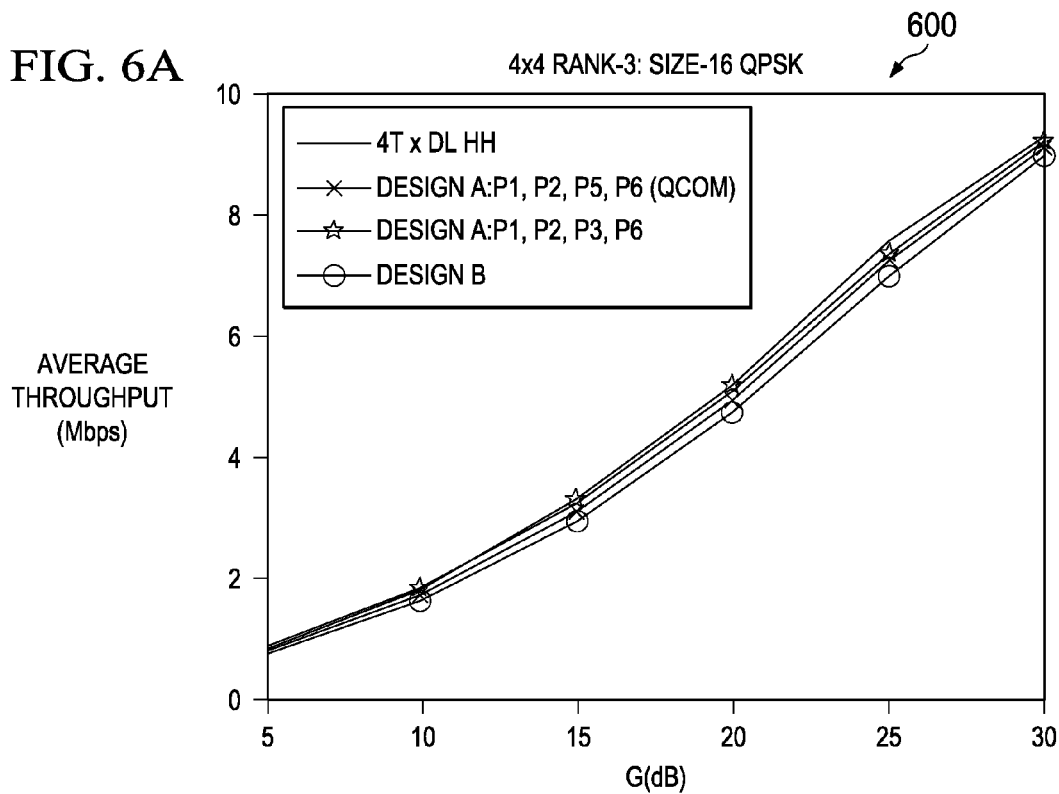
FIGS. 6A and 6B illustrate examples of performance comparisons for Rank-3 codebooks.
Figure 6B:
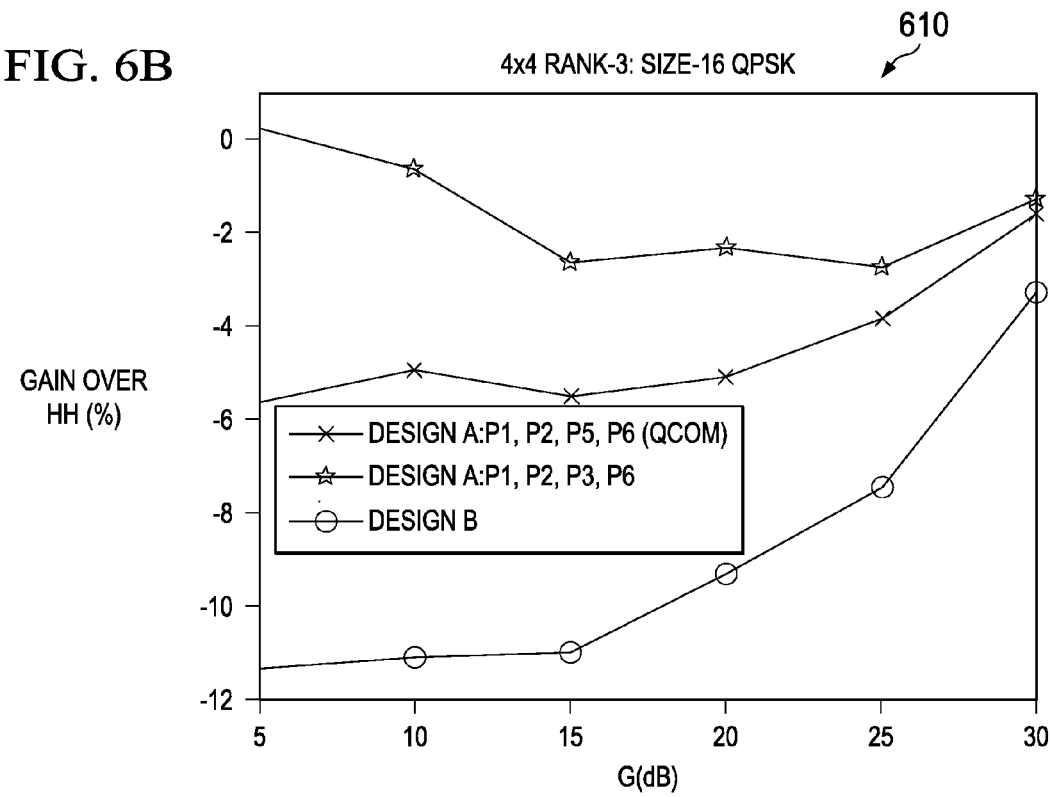
Figure 7A:
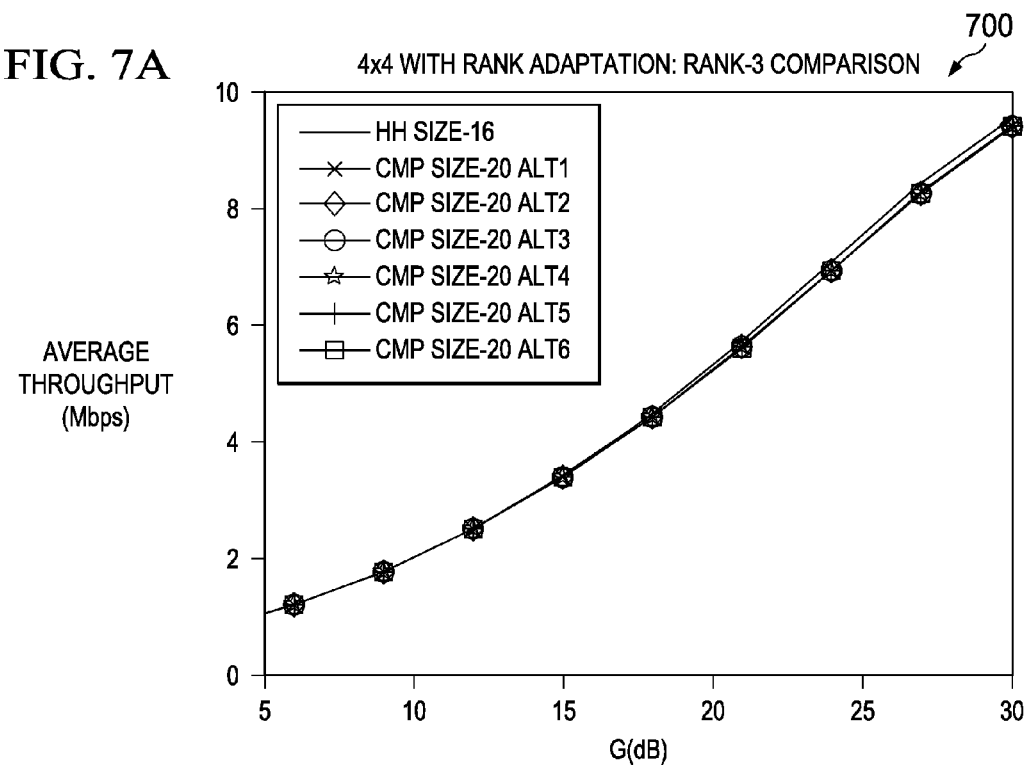
FIGS. 7A, 7B, 7C and 7D illustrate examples of performance comparisons with and without rank adaptation.
Figure 7B:
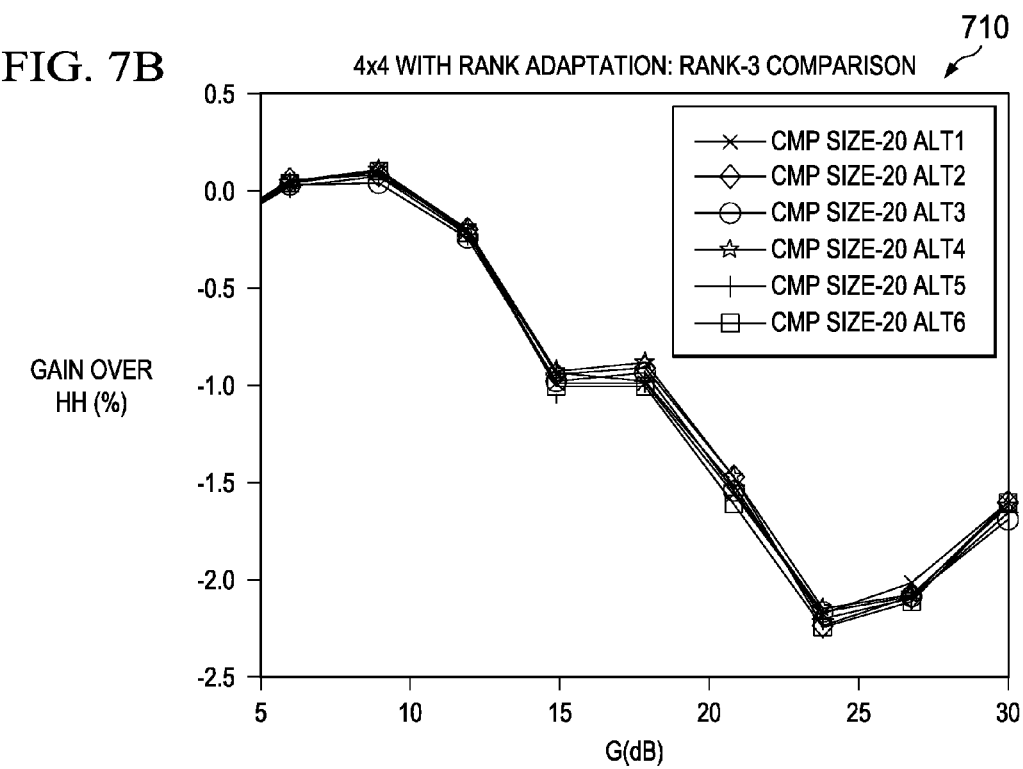
Figure 7C:
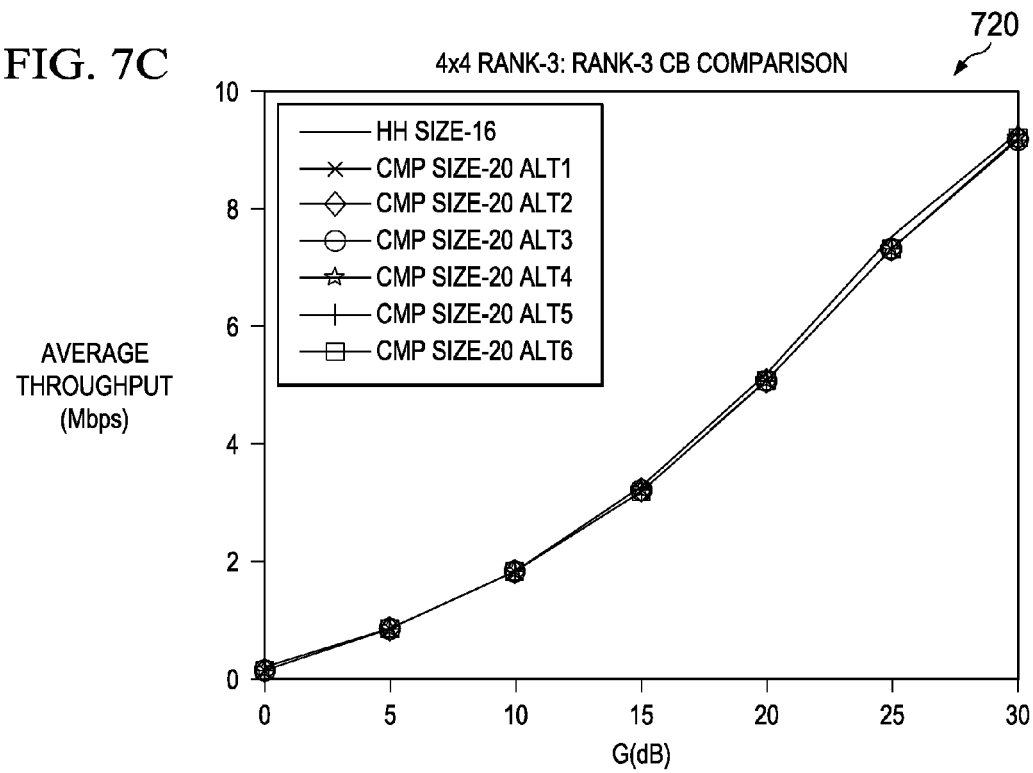
Figure 7D:
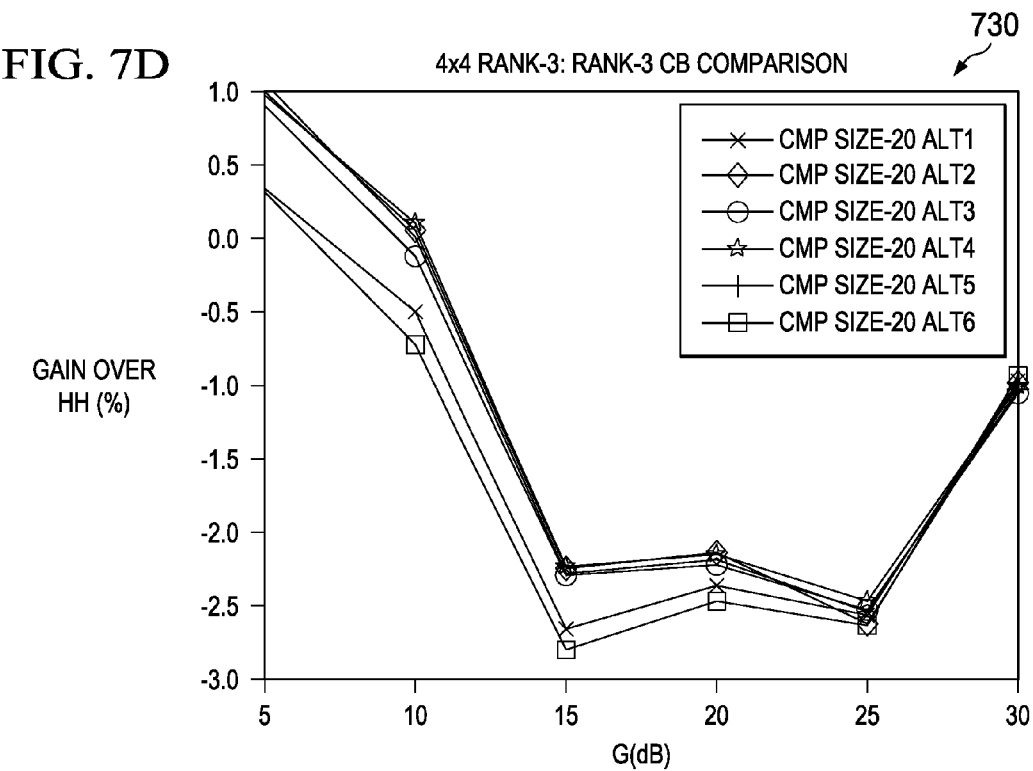
Figure 8A:
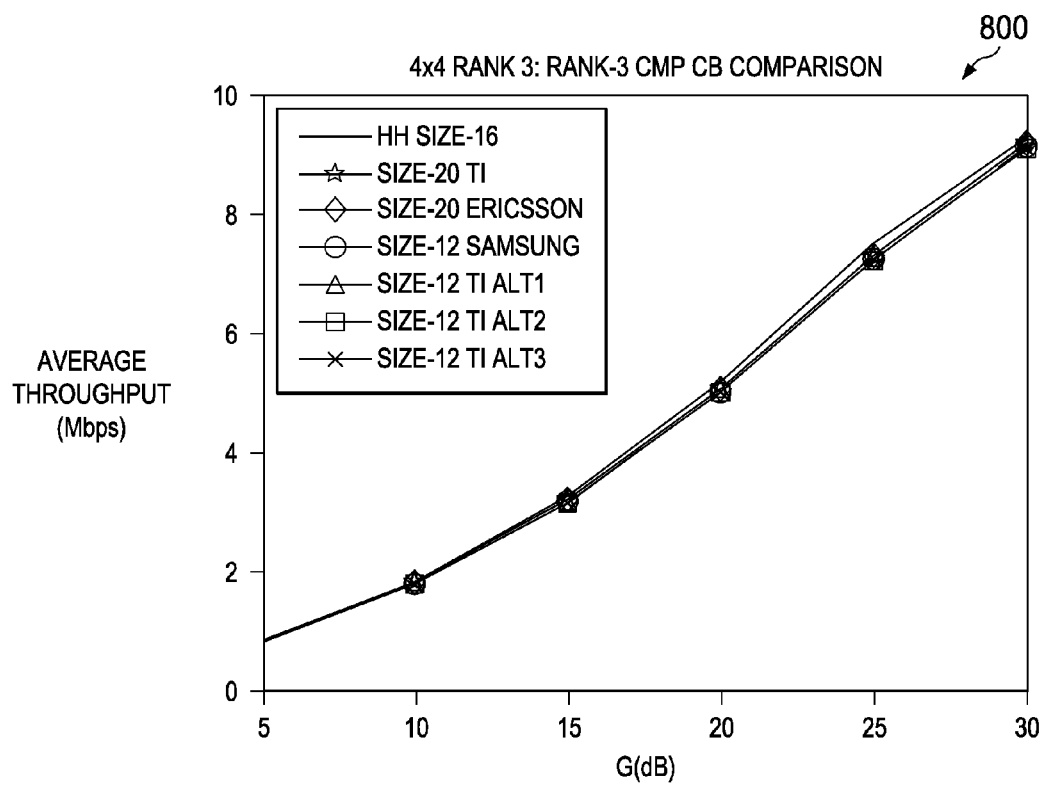
FIGS. 8A, 8B, 8C and 8D illustrate additional examples of performance comparisons with and without rank adaptation.
Figure 8B:
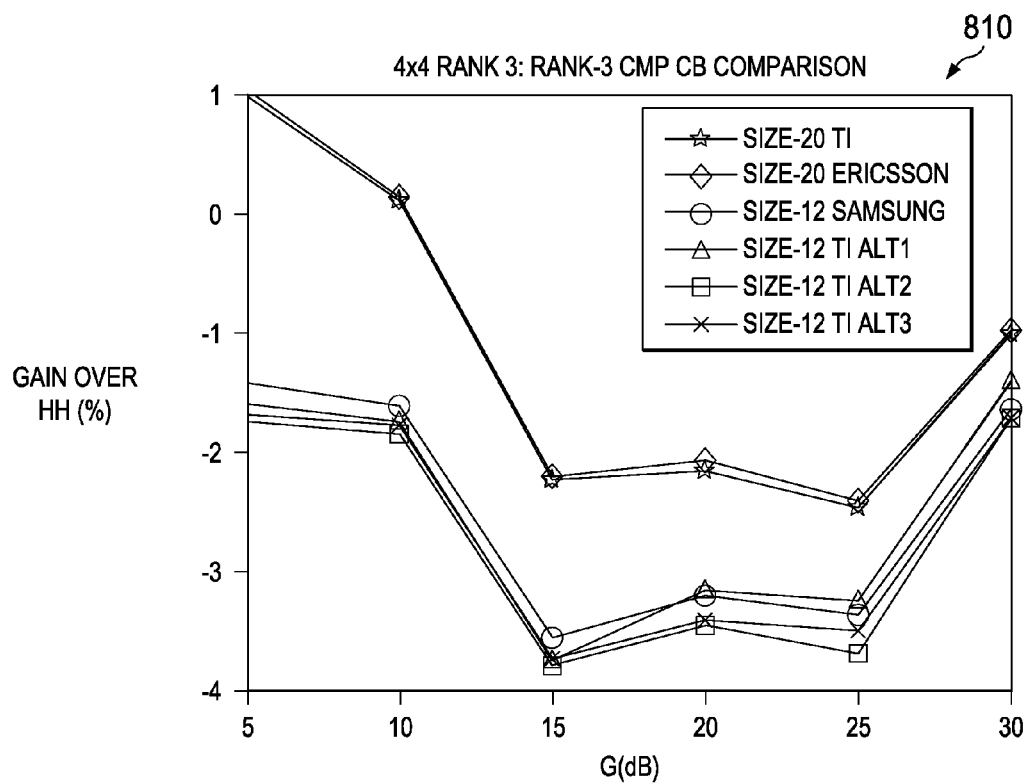
Figure 8C:
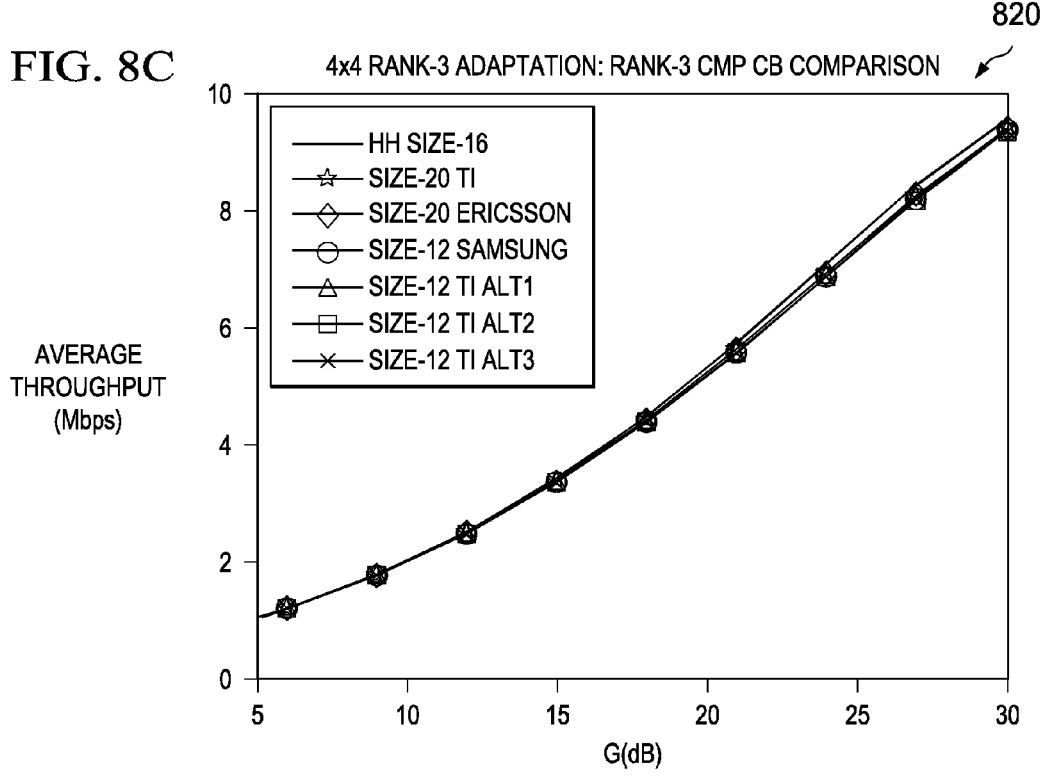
Figure 8D:
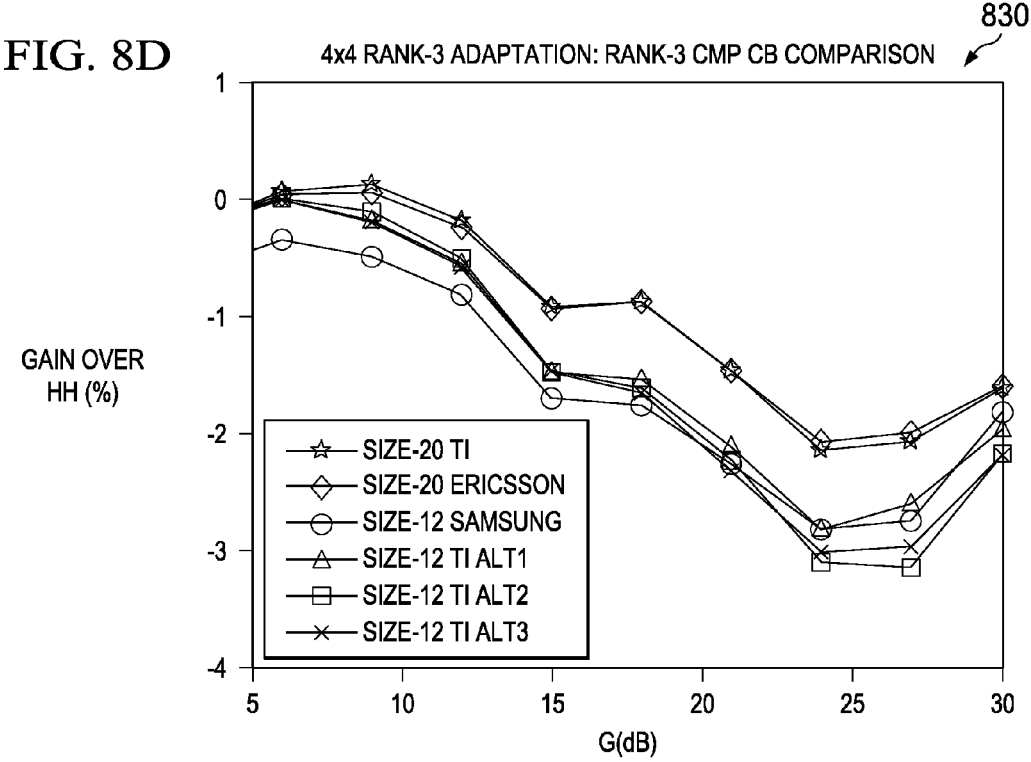

FIGS. 6A and 6B illustrate examples of performance comparisons 600, 610 for Rank-3 codebooks. The 4Tx DL Householder codebook may be used as a reference. Again, the Householder codebook performs better than CM-preserving designs. Overall, Design A given in Table 5 offers the best performance among the CM-preserving designs.

It is also possible to design larger codebooks, for example, size-20. Using the approach in Design A, there are a total of six possibilities: Alt1 (P1,P2,P3.P4,P5), Alt2 (P1,P2,P3,P4,P6), Alt3 (P1,P2,P3,P5,P6), Alt4 (P1,P2,P4,P5,P6), Alt5 (P1,P3,P4,P5,P6), and Alt6 (P2,P3,P4,P5,P6). It may be observed that alternative 4 (Alt4), as shown in Table 6, appears to perform best overall as compared in FIGS. 7A through 7D.

Table 6 illustrates Rank-3 CM-preserving codebooks where each matrix is unit-norm for a size-20 example.

TABLE 6

Rank-3 codebook A
Permutation groups: P1, P2, P4, P5, P6 (Alt4)
Size = 20
Minimum chordal distance = 0.3538
Mean chordal distance = 0.3633

Index 0 to 3

$$\frac{1}{2}\begin{bmatrix} 1 & 0 & 0 \\ 1 & 0 & 0 \\ 0 & 1 & 0 \\ 0 & 0 & 1 \end{bmatrix} \quad \frac{1}{2}\begin{bmatrix} 1 & 0 & 0 \\ j & 0 & 0 \\ 0 & 1 & 0 \\ 0 & 0 & 1 \end{bmatrix} \quad \frac{1}{2}\begin{bmatrix} 1 & 0 & 0 \\ -1 & 0 & 0 \\ 0 & 1 & 0 \\ 0 & 0 & 1 \end{bmatrix} \quad \frac{1}{2}\begin{bmatrix} 1 & 0 & 0 \\ -j & 0 & 0 \\ 0 & 1 & 0 \\ 0 & 0 & 1 \end{bmatrix}$$

Index 4 to 7

$$\frac{1}{2}\begin{bmatrix} 1 & 0 & 0 \\ 0 & 1 & 0 \\ 1 & 0 & 0 \\ 0 & 0 & 1 \end{bmatrix} \quad \frac{1}{2}\begin{bmatrix} 1 & 0 & 0 \\ 0 & 1 & 0 \\ j & 0 & 0 \\ 0 & 0 & 1 \end{bmatrix} \quad \frac{1}{2}\begin{bmatrix} 1 & 0 & 0 \\ 0 & 1 & 0 \\ -1 & 0 & 0 \\ 0 & 0 & 1 \end{bmatrix} \quad \frac{1}{2}\begin{bmatrix} 1 & 0 & 0 \\ 0 & 1 & 0 \\ -j & 0 & 0 \\ 0 & 0 & 1 \end{bmatrix}$$

Index 8 to 11

$$\frac{1}{2}\begin{bmatrix} 0 & 1 & 0 \\ 1 & 0 & 0 \\ 1 & 0 & 0 \\ 0 & 0 & 1 \end{bmatrix} \quad \frac{1}{2}\begin{bmatrix} 0 & 1 & 0 \\ 1 & 0 & 0 \\ j & 0 & 0 \\ 0 & 0 & 1 \end{bmatrix} \quad \frac{1}{2}\begin{bmatrix} 0 & 1 & 0 \\ 1 & 0 & 0 \\ -1 & 0 & 0 \\ 0 & 0 & 1 \end{bmatrix} \quad \frac{1}{2}\begin{bmatrix} 0 & 1 & 0 \\ 1 & 0 & 0 \\ -j & 0 & 0 \\ 0 & 0 & 1 \end{bmatrix}$$

Index 12 to 15

$$\frac{1}{2}\begin{bmatrix} 0 & 1 & 0 \\ 1 & 0 & 0 \\ 0 & 0 & 1 \\ 1 & 0 & 0 \end{bmatrix} \quad \frac{1}{2}\begin{bmatrix} 0 & 1 & 0 \\ 1 & 0 & 0 \\ 0 & 0 & 1 \\ j & 0 & 0 \end{bmatrix} \quad \frac{1}{2}\begin{bmatrix} 0 & 1 & 0 \\ 1 & 0 & 0 \\ 0 & 0 & 1 \\ -1 & 0 & 0 \end{bmatrix} \quad \frac{1}{2}\begin{bmatrix} 0 & 1 & 0 \\ 1 & 0 & 0 \\ 0 & 0 & 1 \\ -j & 0 & 0 \end{bmatrix}$$

TABLE 6-continued

Rank-3 codebook A
Permutation groups: P1, P2, P4, P5, P6 (Alt4)
Size = 20
Minimum chordal distance = 0.3538
Mean chordal distance = 0.3633

Index 0 to 3:
$$\frac{1}{2}\begin{bmatrix}1&0&0\\1&0&0\\0&1&0\\0&0&1\end{bmatrix}, \frac{1}{2}\begin{bmatrix}1&0&0\\j&0&0\\0&1&0\\0&0&1\end{bmatrix}, \frac{1}{2}\begin{bmatrix}1&0&0\\-1&0&0\\0&1&0\\0&0&1\end{bmatrix}, \frac{1}{2}\begin{bmatrix}1&0&0\\-j&0&0\\0&1&0\\0&0&1\end{bmatrix}$$

Index 16 to 19:
$$\frac{1}{2}\begin{bmatrix}0&1&0\\0&0&1\\1&0&0\\1&0&0\end{bmatrix}, \frac{1}{2}\begin{bmatrix}0&1&0\\0&0&1\\1&0&0\\j&0&0\end{bmatrix}, \frac{1}{2}\begin{bmatrix}0&1&0\\0&0&1\\1&0&0\\-1&0&0\end{bmatrix}, \frac{1}{2}\begin{bmatrix}0&1&0\\0&0&1\\1&0&0\\-j&0&0\end{bmatrix}$$

It is also possible to design smaller codebooks, for example, size-12. Possible alternatives may be stated as follows.

(1) For Alt1, use all the six permutation groups and a BPSK-only alphabet.
(2) For Alt2, select only three out of six permutation groups. For each permutation group, a QPSK alphabet is used.
(3) For Alt3, select two permutation groups where a QPSK alphabet is used and use the remaining four permutations with only a size-1 alphabet.

Design examples for the above alternatives are given in Table 7.

Table 7 illustrates Rank-3 CM-preserving codebook designs (size-12).

TABLE 7

Rank-3 codebook E Alt1
Permutation groups: P1, P2, P3, P4, P5, P6
BPSK alphabet
Size = 12
Minimum chordal distance = 0.3538
Mean chordal distance = 0.3716

Index 0 to 3:
$$\frac{1}{2}\begin{bmatrix}1&0&0\\1&0&0\\0&1&0\\0&0&1\end{bmatrix}, \frac{1}{2}\begin{bmatrix}1&0&0\\-1&0&0\\0&1&0\\0&0&1\end{bmatrix}, \frac{1}{2}\begin{bmatrix}1&0&0\\0&1&0\\1&0&0\\0&0&1\end{bmatrix}, \frac{1}{2}\begin{bmatrix}1&0&0\\0&1&0\\-1&0&0\\0&0&1\end{bmatrix}$$

Index 4 to 7:
$$\frac{1}{2}\begin{bmatrix}1&0&0\\0&1&0\\0&0&1\\1&0&0\end{bmatrix}, \frac{1}{2}\begin{bmatrix}1&0&0\\0&1&0\\0&0&1\\-1&0&0\end{bmatrix}, \frac{1}{2}\begin{bmatrix}0&1&0\\1&0&0\\1&0&0\\0&0&1\end{bmatrix}, \frac{1}{2}\begin{bmatrix}0&1&0\\1&0&0\\-1&0&0\\0&0&1\end{bmatrix}$$

Index 8 to 11:
$$\frac{1}{2}\begin{bmatrix}0&1&0\\1&0&0\\0&0&1\\1&0&0\end{bmatrix}, \frac{1}{2}\begin{bmatrix}0&1&0\\1&0&0\\0&0&1\\-1&0&0\end{bmatrix}, \frac{1}{2}\begin{bmatrix}0&1&0\\0&0&1\\1&0&0\\1&0&0\end{bmatrix}, \frac{1}{2}\begin{bmatrix}0&1&0\\0&0&1\\1&0&0\\-1&0&0\end{bmatrix}$$

Rank-3 codebook E Alt2
Permutation groups: P1, P4, P6
QPSK alphabet
Size = 12
Minimum chordal distance = 0.3538
Mean chordal distance = 0.3716

Index 0 to 3:
$$\frac{1}{2}\begin{bmatrix}1&0&0\\1&0&0\\0&1&0\\0&0&1\end{bmatrix}, \frac{1}{2}\begin{bmatrix}1&0&0\\j&0&0\\0&1&0\\0&0&1\end{bmatrix}, \frac{1}{2}\begin{bmatrix}1&0&0\\-1&0&0\\0&1&0\\0&0&1\end{bmatrix}, \frac{1}{2}\begin{bmatrix}1&0&0\\-j&0&0\\0&1&0\\0&0&1\end{bmatrix}$$

Index 4 to 7:
$$\frac{1}{2}\begin{bmatrix}0&1&0\\1&0&0\\1&0&0\\0&0&1\end{bmatrix}, \frac{1}{2}\begin{bmatrix}0&1&0\\1&0&0\\j&0&0\\0&0&1\end{bmatrix}, \frac{1}{2}\begin{bmatrix}0&1&0\\1&0&0\\-1&0&0\\0&0&1\end{bmatrix}, \frac{1}{2}\begin{bmatrix}0&1&0\\1&0&0\\-j&0&0\\0&0&1\end{bmatrix}$$

TABLE 7-continued

Index 8 to 11

$$\frac{1}{2}\begin{bmatrix} 0 & 1 & 0 \\ 0 & 0 & 1 \\ 1 & 0 & 0 \\ 1 & 0 & 0 \end{bmatrix} \quad \frac{1}{2}\begin{bmatrix} 0 & 1 & 0 \\ 0 & 0 & 1 \\ 1 & 0 & 0 \\ j & 0 & 0 \end{bmatrix} \quad \frac{1}{2}\begin{bmatrix} 0 & 1 & 0 \\ 0 & 0 & 1 \\ 1 & 0 & 0 \\ -1 & 0 & 0 \end{bmatrix} \quad \frac{1}{2}\begin{bmatrix} 0 & 1 & 0 \\ 0 & 0 & 1 \\ 1 & 0 & 0 \\ -j & 0 & 0 \end{bmatrix}$$

Rank-3 codebook E Alt3
QPSK alphabet with P1, P6; Single-alphabet with P2, P3, P4, P5
Size = 12
Minimum chordal distance = 0.3538
Mean chordal distance = 0.3716

Index 0 to 3

$$\frac{1}{2}\begin{bmatrix} 1 & 0 & 0 \\ 1 & 0 & 0 \\ 0 & 1 & 0 \\ 0 & 0 & 1 \end{bmatrix} \quad \frac{1}{2}\begin{bmatrix} 1 & 0 & 0 \\ j & 0 & 0 \\ 0 & 1 & 0 \\ 0 & 0 & 1 \end{bmatrix} \quad \frac{1}{2}\begin{bmatrix} 1 & 0 & 0 \\ -1 & 0 & 0 \\ 0 & 1 & 0 \\ 0 & 0 & 1 \end{bmatrix} \quad \frac{1}{2}\begin{bmatrix} 1 & 0 & 0 \\ -j & 0 & 0 \\ 0 & 1 & 0 \\ 0 & 0 & 1 \end{bmatrix}$$

Index 4 to 7

$$\frac{1}{2}\begin{bmatrix} 1 & 0 & 0 \\ 0 & 1 & 0 \\ 1 & 0 & 0 \\ 0 & 0 & 1 \end{bmatrix} \quad \frac{1}{2}\begin{bmatrix} 1 & 0 & 0 \\ 0 & 1 & 0 \\ 0 & 0 & 1 \\ 1 & 0 & 0 \end{bmatrix} \quad \frac{1}{2}\begin{bmatrix} 0 & 1 & 0 \\ 1 & 0 & 0 \\ 1 & 0 & 0 \\ 0 & 0 & 1 \end{bmatrix} \quad \frac{1}{2}\begin{bmatrix} 0 & 1 & 0 \\ 1 & 0 & 0 \\ 0 & 0 & 1 \\ 1 & 0 & 0 \end{bmatrix}$$

Index 8 to 11

$$\frac{1}{2}\begin{bmatrix} 0 & 1 & 0 \\ 0 & 0 & 1 \\ 1 & 0 & 0 \\ 1 & 0 & 0 \end{bmatrix} \quad \frac{1}{2}\begin{bmatrix} 0 & 1 & 0 \\ 0 & 0 & 1 \\ 1 & 0 & 0 \\ j & 0 & 0 \end{bmatrix} \quad \frac{1}{2}\begin{bmatrix} 0 & 1 & 0 \\ 0 & 0 & 1 \\ 1 & 0 & 0 \\ -1 & 0 & 0 \end{bmatrix} \quad \frac{1}{2}\begin{bmatrix} 0 & 1 & 0 \\ 0 & 0 & 1 \\ 1 & 0 & 0 \\ -j & 0 & 0 \end{bmatrix}$$

FIGS. 8A, 8B, 8C and 8D illustrate additional examples of performance comparisons with and without rank adaptation. Additional codebook designs are also simulated as references.

Figure 9:
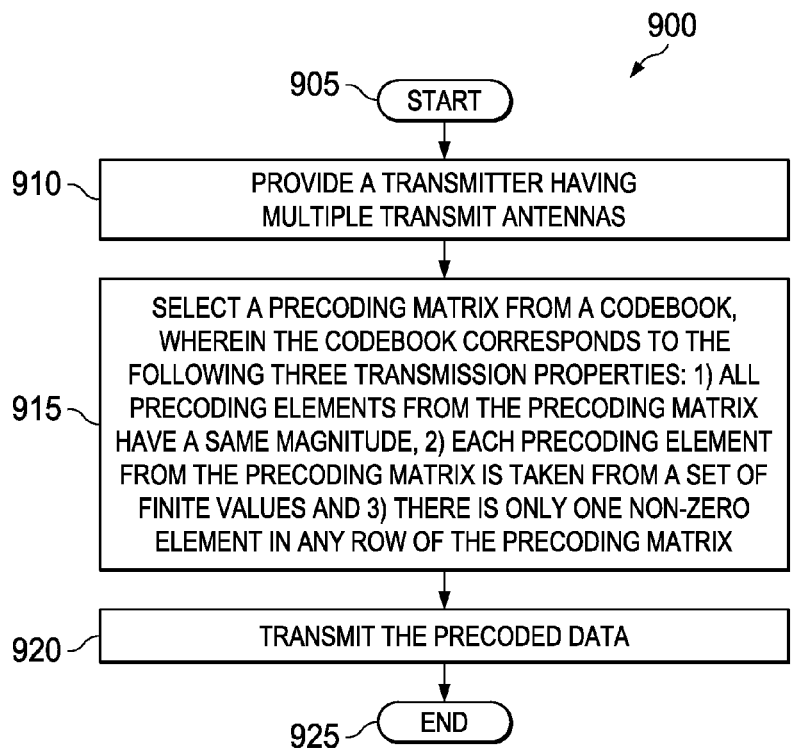
FIG. 9 illustrates a method of operating a transmitter for use with multiple transmit antennas as provided by one embodiment of the disclosure.

FIG. 9 illustrates a flow diagram of a method 900 of operating a transmitter as provided by one embodiment of the disclosure. The method starts in a step 905, and a transmitter having multiple transmit antennas is provided in a step 910. Then, a precoding matrix is selected from a codebook, wherein the codebook corresponds to the following three transmission properties for an uplink transmission: 1) all precoding elements from the precoding matrix have a same magnitude, 2) each precoding element from the precoding matrix is taken from a set of finite values and 3) there is only one non-zero element in any row of the precoding matrix in a step 915.

In one embodiment, the codebook for a rank-1 transmission corresponds to a set of four-element column vectors containing at least a subset of the following sixteen vectors shown in Table 8, below.

TABLE 8

$$\frac{1}{2}\begin{bmatrix} 1 \\ 1 \\ 1 \\ -1 \end{bmatrix} \quad \frac{1}{2}\begin{bmatrix} 1 \\ 1 \\ j \\ j \end{bmatrix} \quad \frac{1}{2}\begin{bmatrix} 1 \\ 1 \\ -1 \\ 1 \end{bmatrix} \quad \frac{1}{2}\begin{bmatrix} 1 \\ 1 \\ -j \\ -j \end{bmatrix} \quad \frac{1}{2}\begin{bmatrix} 1 \\ j \\ 1 \\ -j \end{bmatrix} \quad \frac{1}{2}\begin{bmatrix} 1 \\ j \\ j \\ 1 \end{bmatrix} \quad \frac{1}{2}\begin{bmatrix} 1 \\ j \\ -1 \\ -j \end{bmatrix} \quad \frac{1}{2}\begin{bmatrix} 1 \\ j \\ -j \\ -1 \end{bmatrix}$$

$$\frac{1}{2}\begin{bmatrix} 1 \\ -1 \\ 1 \\ 1 \end{bmatrix} \quad \frac{1}{2}\begin{bmatrix} 1 \\ -1 \\ j \\ -j \end{bmatrix} \quad \frac{1}{2}\begin{bmatrix} 1 \\ -1 \\ -1 \\ -1 \end{bmatrix} \quad \frac{1}{2}\begin{bmatrix} 1 \\ -1 \\ -j \\ j \end{bmatrix} \quad \frac{1}{2}\begin{bmatrix} 1 \\ -j \\ 1 \\ j \end{bmatrix} \quad \frac{1}{2}\begin{bmatrix} 1 \\ -j \\ j \\ -1 \end{bmatrix} \quad \frac{1}{2}\begin{bmatrix} 1 \\ -j \\ -1 \\ -j \end{bmatrix} \quad \frac{1}{2}\begin{bmatrix} 1 \\ -j \\ -j \\ 1 \end{bmatrix}$$

In another embodiment, the codebook for a rank-2 transmission corresponds to a set of four-by-two matrices with one column having two non-zero elements in two adjacent rows, a remaining column having two non-zero elements in two remaining adjacent rows and, zero elements in all remaining element positions and contains at least a subset of the following eight matrices shown in Table 9, below.

TABLE 9

$$\frac{1}{2}\begin{bmatrix} 1 & 0 \\ 1 & 0 \\ 0 & 1 \\ 0 & -j \end{bmatrix} \quad \frac{1}{2}\begin{bmatrix} 1 & 0 \\ 1 & 0 \\ 0 & 1 \\ 0 & j \end{bmatrix} \quad \frac{1}{2}\begin{bmatrix} 1 & 0 \\ -j & 0 \\ 0 & 1 \\ 0 & 1 \end{bmatrix} \quad \frac{1}{2}\begin{bmatrix} 1 & 0 \\ -j & 0 \\ 0 & 1 \\ 0 & -1 \end{bmatrix}$$

$$\frac{1}{2}\begin{bmatrix} 1 & 0 \\ -1 & 0 \\ 0 & 1 \\ 0 & -j \end{bmatrix} \quad \frac{1}{2}\begin{bmatrix} 1 & 0 \\ -1 & 0 \\ 0 & 1 \\ 0 & j \end{bmatrix} \quad \frac{1}{2}\begin{bmatrix} 1 & 0 \\ j & 0 \\ 0 & 1 \\ 0 & 1 \end{bmatrix} \quad \frac{1}{2}\begin{bmatrix} 1 & 0 \\ j & 0 \\ 0 & 1 \\ 0 & -1 \end{bmatrix}$$

In yet another embodiment, the codebook for a rank-3 transmission corresponds to a set of four-by-three matrices with a first column having two non-zero elements, a second column having one non-zero element, a third column having one non-zero element, zero elements in all remaining element positions and contains at least a subset of the following twelve matrices shown in Table 10, below.

TABLE 10

$$\frac{1}{2}\begin{bmatrix} 1 & 0 & 0 \\ 1 & 0 & 0 \\ 0 & 1 & 0 \\ 0 & 0 & 1 \end{bmatrix} \quad \frac{1}{2}\begin{bmatrix} 1 & 0 & 0 \\ -1 & 0 & 0 \\ 0 & 1 & 0 \\ 0 & 0 & 1 \end{bmatrix} \quad \frac{1}{2}\begin{bmatrix} 1 & 0 & 0 \\ 0 & 1 & 0 \\ 1 & 0 & 0 \\ 0 & 0 & 1 \end{bmatrix} \quad \frac{1}{2}\begin{bmatrix} 1 & 0 & 0 \\ 0 & 1 & 0 \\ -1 & 0 & 0 \\ 0 & 0 & 1 \end{bmatrix}$$

$$\frac{1}{2}\begin{bmatrix} 1 & 0 & 0 \\ 0 & 1 & 0 \\ 0 & 0 & 1 \\ 1 & 0 & 0 \end{bmatrix} \quad \frac{1}{2}\begin{bmatrix} 1 & 0 & 0 \\ 0 & 1 & 0 \\ 0 & 0 & 1 \\ -1 & 0 & 0 \end{bmatrix} \quad \frac{1}{2}\begin{bmatrix} 0 & 1 & 0 \\ 1 & 0 & 0 \\ 1 & 0 & 0 \\ 0 & 0 & 1 \end{bmatrix} \quad \frac{1}{2}\begin{bmatrix} 0 & 1 & 0 \\ 1 & 0 & 0 \\ -1 & 0 & 0 \\ 0 & 0 & 1 \end{bmatrix}$$

$$\frac{1}{2}\begin{bmatrix} 0 & 1 & 0 \\ 1 & 0 & 0 \\ 0 & 0 & 1 \\ 1 & 0 & 0 \end{bmatrix} \quad \frac{1}{2}\begin{bmatrix} 0 & 1 & 0 \\ 1 & 0 & 0 \\ 0 & 0 & 1 \\ -1 & 0 & 0 \end{bmatrix} \quad \frac{1}{2}\begin{bmatrix} 0 & 1 & 0 \\ 0 & 0 & 1 \\ 1 & 0 & 0 \\ 1 & 0 & 0 \end{bmatrix} \quad \frac{1}{2}\begin{bmatrix} 0 & 1 & 0 \\ 0 & 0 & 1 \\ 1 & 0 & 0 \\ -1 & 0 & 0 \end{bmatrix}$$

The precoded data is transmitted in a step 920 and the method 900 ends in a step 925.

Figure 10:
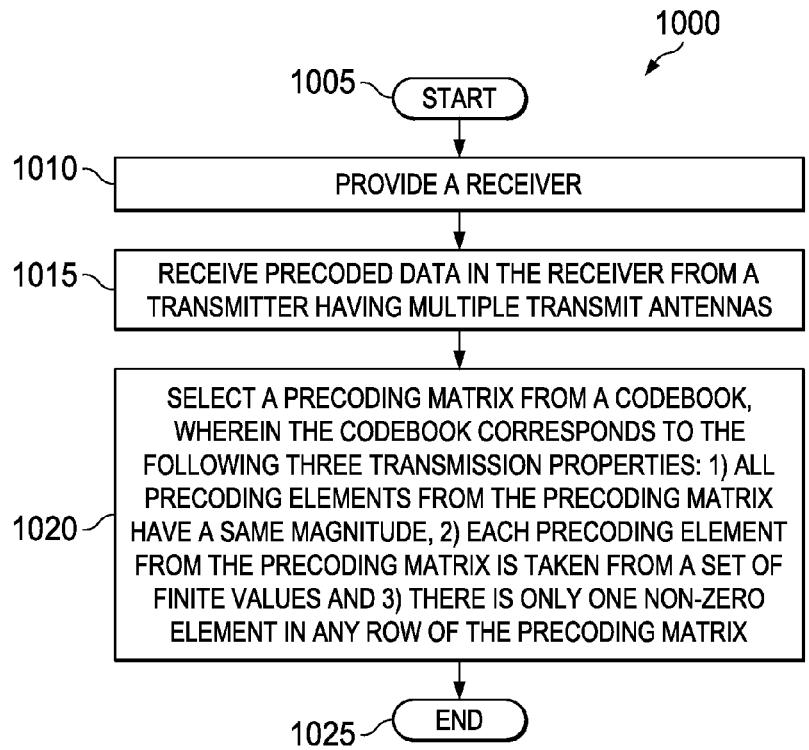
FIG. 10 illustrates a method of operating a receiver as provided by one embodiment of the disclosure.

FIG. 10 illustrates a flow diagram of a method of operating a receiver as provided by one embodiment of the disclosure. The method 10 starts in a step 1005, and a receiver is provided in a step 1010. Then, precoded data from a transmitter having multiple transmit antennas is received in a step 1015.

A precoding matrix is selected from a codebook in a step 1020, wherein the codebook corresponds to the following three transmission properties for an uplink transmission: 1) all precoding elements from the precoding matrix have a same magnitude, 2) each precoding element from the precoding matrix is taken from a set of finite values and 3) there is only one non-zero element in any row of the precoding matrix.

In one embodiment, the codebook for a rank-1 transmission corresponds to a set of four-element column vectors containing at least a subset of the following sixteen vectors shown in Table 11, below.

TABLE 11

$$\frac{1}{2}\begin{bmatrix}1\\1\\1\\-1\end{bmatrix} \quad \frac{1}{2}\begin{bmatrix}1\\1\\j\\j\end{bmatrix} \quad \frac{1}{2}\begin{bmatrix}1\\1\\-1\\1\end{bmatrix} \quad \frac{1}{2}\begin{bmatrix}1\\1\\-j\\-j\end{bmatrix} \quad \frac{1}{2}\begin{bmatrix}1\\j\\1\\-j\end{bmatrix} \quad \frac{1}{2}\begin{bmatrix}1\\j\\j\\1\end{bmatrix} \quad \frac{1}{2}\begin{bmatrix}1\\j\\-1\\-j\end{bmatrix} \quad \frac{1}{2}\begin{bmatrix}1\\j\\-j\\-1\end{bmatrix}$$

$$\frac{1}{2}\begin{bmatrix}1\\-1\\1\\1\end{bmatrix} \quad \frac{1}{2}\begin{bmatrix}1\\-1\\j\\-j\end{bmatrix} \quad \frac{1}{2}\begin{bmatrix}1\\-1\\-1\\-1\end{bmatrix} \quad \frac{1}{2}\begin{bmatrix}1\\-1\\-j\\-1\end{bmatrix} \quad \frac{1}{2}\begin{bmatrix}1\\-j\\1\\j\end{bmatrix} \quad \frac{1}{2}\begin{bmatrix}1\\-j\\j\\-1\end{bmatrix} \quad \frac{1}{2}\begin{bmatrix}1\\-j\\-1\\-j\end{bmatrix} \quad \frac{1}{2}\begin{bmatrix}1\\-j\\-j\\1\end{bmatrix}$$

In another embodiment, the codebook for a rank-2 transmission corresponds to a set of four-by-two matrices with one column having two non-zero elements in two adjacent rows, a remaining column having two non-zero elements in two remaining adjacent rows and, zero elements in all remaining element positions and contains at least a subset of the following eight matrices shown in Table 12, below.

TABLE 12

$$\frac{1}{2}\begin{bmatrix}1 & 0\\1 & 0\\0 & 1\\0 & -j\end{bmatrix} \quad \frac{1}{2}\begin{bmatrix}1 & 0\\1 & 0\\0 & 1\\0 & j\end{bmatrix} \quad \frac{1}{2}\begin{bmatrix}1 & 0\\-j & 0\\0 & 1\\0 & 1\end{bmatrix} \quad \frac{1}{2}\begin{bmatrix}1 & 0\\-j & 0\\0 & 1\\0 & -1\end{bmatrix}$$

$$\frac{1}{2}\begin{bmatrix}1 & 0\\-1 & 0\\0 & 1\\0 & -j\end{bmatrix} \quad \frac{1}{2}\begin{bmatrix}1 & 0\\-1 & 0\\0 & 1\\0 & j\end{bmatrix} \quad \frac{1}{2}\begin{bmatrix}1 & 0\\j & 0\\0 & 1\\0 & 1\end{bmatrix} \quad \frac{1}{2}\begin{bmatrix}1 & 0\\j & 0\\0 & 1\\0 & -1\end{bmatrix}$$

In yet another embodiment, the codebook for a rank-3 transmission corresponds to a set of four-by-three matrices with a first column having two non-zero elements, a second column having one non-zero element, a third column having one non-zero element, zero elements in all remaining element positions and contains at least a subset of the following twelve matrices shown in Table 13, below.

TABLE 13

$$\frac{1}{2}\begin{bmatrix}1 & 0 & 0\\1 & 0 & 0\\0 & 1 & 0\\0 & 0 & 1\end{bmatrix} \quad \frac{1}{2}\begin{bmatrix}1 & 0 & 0\\-1 & 0 & 0\\0 & 1 & 0\\0 & 0 & 1\end{bmatrix} \quad \frac{1}{2}\begin{bmatrix}1 & 0 & 0\\0 & 1 & 0\\1 & 0 & 0\\0 & 0 & 1\end{bmatrix} \quad \frac{1}{2}\begin{bmatrix}1 & 0 & 0\\0 & 1 & 0\\-1 & 0 & 0\\0 & 0 & 1\end{bmatrix}$$

$$\frac{1}{2}\begin{bmatrix}1 & 0 & 0\\0 & 1 & 0\\0 & 0 & 1\\1 & 0 & 0\end{bmatrix} \quad \frac{1}{2}\begin{bmatrix}1 & 0 & 0\\0 & 1 & 0\\0 & 0 & 1\\-1 & 0 & 0\end{bmatrix} \quad \frac{1}{2}\begin{bmatrix}0 & 1 & 0\\1 & 0 & 0\\1 & 0 & 0\\0 & 0 & 1\end{bmatrix} \quad \frac{1}{2}\begin{bmatrix}0 & 1 & 0\\1 & 0 & 0\\-1 & 0 & 0\\0 & 0 & 1\end{bmatrix}$$

$$\frac{1}{2}\begin{bmatrix}0 & 1 & 0\\1 & 0 & 0\\0 & 0 & 1\\1 & 0 & 0\end{bmatrix} \quad \frac{1}{2}\begin{bmatrix}0 & 1 & 0\\1 & 0 & 0\\0 & 0 & 1\\-1 & 0 & 0\end{bmatrix} \quad \frac{1}{2}\begin{bmatrix}0 & 1 & 0\\0 & 0 & 1\\1 & 0 & 0\\1 & 0 & 0\end{bmatrix} \quad \frac{1}{2}\begin{bmatrix}0 & 1 & 0\\0 & 0 & 1\\1 & 0 & 0\\-1 & 0 & 0\end{bmatrix}$$

The method 900 ends in a step 925.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the disclosure.

What is claimed is:

1. A transmitter for use with multiple transmit antennas, comprising:

a precoder unit configured to precode data for a transmission using a precoding matrix selected from a codebook, wherein the codebook corresponds to the following three transmission properties for an uplink transmission: 1) all non-zero precoding elements from the precoding matrix have a same magnitude, 2) each precoding element from the precoding matrix is taken from a set of finite values and 3) there is only one non-zero element in any row of the precoding matrix;

a transmit unit configured to transmit the precoded data; and wherein the codebook for a rank-1 transmission corresponds to a set of four-element column vectors containing at least a subset of the following vectors:

| | | | | |
|---|---|---|---|---|
| | | | $\frac{1}{2}\begin{bmatrix}1\\j\\j\\1\end{bmatrix}$ | $\frac{1}{2}\begin{bmatrix}1\\j\\-j\\-1\end{bmatrix}$ |
| $\frac{1}{2}\begin{bmatrix}1\\-1\\j\\-j\end{bmatrix}$ | $\frac{1}{2}\begin{bmatrix}1\\-1\\-j\\j\end{bmatrix}$ | | $\frac{1}{2}\begin{bmatrix}1\\-j\\j\\-1\end{bmatrix}$ | $\frac{1}{2}\begin{bmatrix}1\\-j\\-j\\1\end{bmatrix}$ |

2. A transmitter for use with multiple transmit antennas, comprising:

a precoder unit configured to precode data for a transmission using a precoding matrix selected from a codebook, wherein the codebook corresponds to the following three transmission properties for an uplink transmission: 1) all non-zero precoding elements from the precoding matrix have a same magnitude, 2) each precoding element from the precoding matrix is taken from a set of finite values and 3) there is only one non-zero element in any row of the precoding matrix;

a transmit unit configured to transmit the precoded data;

wherein the codebook for a rank-3 transmission corresponds to a set of four-by-three matrices with a first column having two non-zero elements, a second column having one non-zero element, a third column having one non-zero element and zero elements in all remaining element positions; and wherein the codebook for the rank-3 transmission contains at least a subset of the following matrices:

| | | | |
|---|---|---|---|
| $\frac{1}{2}\begin{bmatrix}1&0&0\\1&0&0\\0&1&0\\0&0&1\end{bmatrix}$ | $\frac{1}{2}\begin{bmatrix}1&0&0\\-1&0&0\\0&1&0\\0&0&1\end{bmatrix}$ | | |
| | | $\frac{1}{2}\begin{bmatrix}0&1&0\\1&0&0\\1&0&0\\0&0&1\end{bmatrix}$ | $\frac{1}{2}\begin{bmatrix}0&1&0\\1&0&0\\-1&0&0\\0&0&1\end{bmatrix}$ |
| | | $\frac{1}{2}\begin{bmatrix}0&1&0\\0&0&1\\1&0&0\\1&0&0\end{bmatrix}$ | $\frac{1}{2}\begin{bmatrix}0&1&0\\0&0&1\\1&0&0\\-1&0&0\end{bmatrix}$ |

3. A method of operating a transmitter for use with multiple transmit antennas, comprising:

selecting a precoding matrix from a codebook, wherein the codebook corresponds to the following three transmission properties for an uplink transmission: 1) all non-zero precoding elements from the precoding matrix have a same magnitude, 2) each precoding element from the precoding matrix is taken from a set of finite values and 3) there is only one non-zero element in any row of the precoding matrix, wherein the codebook for a rank-1 transmission corresponds to a set of four-element column vectors containing at least a subset of the following vectors:

| | | | | |
|---|---|---|---|---|
| | | | $\frac{1}{2}\begin{bmatrix}1\\j\\j\\1\end{bmatrix}$ | $\frac{1}{2}\begin{bmatrix}1\\j\\-j\\-1\end{bmatrix}$ |
| $\frac{1}{2}\begin{bmatrix}1\\-1\\j\\-j\end{bmatrix}$ | $\frac{1}{2}\begin{bmatrix}1\\-1\\-j\\j\end{bmatrix}$ | | $\frac{1}{2}\begin{bmatrix}1\\-j\\j\\-1\end{bmatrix}$ | $\frac{1}{2}\begin{bmatrix}1\\-j\\-j\\1\end{bmatrix}$ | and;

transmitting the precoded data from the transmitter.

4. A method of operating a transmitter for use with multiple transmit antennas, comprising:

selecting a precoding matrix from a codebook, wherein the codebook corresponds to the following three transmission properties for an uplink transmission: 1) all non-zero precoding elements from the precoding matrix have a same magnitude, 2) each precoding element from the precoding matrix is taken from a set of finite values and 3) there is only one non-zero element in any row of the precoding matrix, wherein the codebook for a rank-3 transmission corresponds to a set of four-by-three matrices with a first column having two non-zero elements, a second column having one non-zero element, a third column having one non-zero element, zero elements in all remaining element positions and contains at least a subset of the following matrices:

| | | | |
|---|---|---|---|
| $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ -1 & 0 & 0 \\ 0 & 1 & 0 \\ 0 & 0 & 1 \end{bmatrix}$ | | |
| | | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ |
| | | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ | and;

transmitting the precoded data from the transmitter.

5. A receiver, comprising:

a receive unit configured to receive precoded data from a transmitter having multiple transmit antennas; and a precoder selection unit configured to select a precoding matrix from a codebook, wherein the codebook corresponds to the following three transmission properties for an uplink transmission: 1) all non-zero precoding elements from the preceding matrix have a same magnitude, 2) each preceding element from the preceding matrix is taken from a set of finite values and 3) there is only one non-zero element in any row of the preceding matrix, wherein the codebook for a rank-1 transmission corresponds to a set of four-element column vectors containing at least a subset of the following vectors:

| | | | |
|---|---|---|---|
| | | $\frac{1}{2}\begin{bmatrix} 1 \\ j \\ j \\ 1 \end{bmatrix}$ | $\frac{1}{2}\begin{bmatrix} 1 \\ j \\ -j \\ -1 \end{bmatrix}$ |
| $\frac{1}{2}\begin{bmatrix} 1 \\ -1 \\ j \\ -j \end{bmatrix}$ | $\frac{1}{2}\begin{bmatrix} 1 \\ -1 \\ -j \\ j \end{bmatrix}$ | $\frac{1}{2}\begin{bmatrix} 1 \\ -j \\ j \\ -1 \end{bmatrix}$ | $\frac{1}{2}\begin{bmatrix} 1 \\ -j \\ -j \\ 1 \end{bmatrix}$ |

6. A receiver, comprising:

a receive unit configured to receive precoded data from a transmitter having multiple transmit antennas; and a precoder selection unit configured to select a precoding matrix from a codebook, wherein the codebook corresponds to the following three transmission properties for an uplink transmission: 1) all non-zero precoding elements from the preceding matrix have a same magnitude, 2) each preceding element from the preceding matrix is taken from a set of finite values and 3) there is only one non-zero element in any row of the preceding matrix;

wherein the codebook for a rank-3 transmission corresponds to a set of four-by-three matrices with a first column having two non-zero elements, a second column having one non-zero element, a third column having one non-zero element and zero elements in all remaining element positions; and wherein the codebook for the rank-3 transmission contains at least a subset of the following matrices:

| | | | |
|---|---|---|---|
| $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ -1 & 0 & 0 \\ 0 & 1 & 0 \\ 0 & 0 & 1 \end{bmatrix}$ | | |
| | | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ |
| | | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$. |

7. A method of operating a receiver, comprising:

receiving in the receiver precoded data from a transmitter having multiple transmit antennas; and selecting a precoding matrix from a codebook, wherein the codebook corresponds to the following three transmission properties for an uplink transmission: 1) all non-zero preceding elements from the precoding matrix have a same magnitude, 2) each precoding element from the precoding matrix is taken from a set of finite values and 3) there is only one non-zero element in any row of the precoding matrix, wherein the codebook for a rank-1 transmission corresponds to a set of four-element column vectors containing at least a subset of the following vectors:

| | | | |
|---|---|---|---|
| | | $\frac{1}{2}\begin{bmatrix} 1 \\ j \\ j \\ 1 \end{bmatrix}$ | $\frac{1}{2}\begin{bmatrix} 1 \\ j \\ -j \\ -1 \end{bmatrix}$ |
| $\frac{1}{2}\begin{bmatrix} 1 \\ -1 \\ j \\ -j \end{bmatrix}$ | $\frac{1}{2}\begin{bmatrix} 1 \\ -1 \\ -j \\ j \end{bmatrix}$ | $\frac{1}{2}\begin{bmatrix} 1 \\ -j \\ j \\ -1 \end{bmatrix}$ | $\frac{1}{2}\begin{bmatrix} 1 \\ -j \\ -j \\ 1 \end{bmatrix}$. |

8. A method of operating a receiver, comprising:

receiving in the receiver precoded data from a transmitter having multiple transmit antennas; and selecting a precoding matrix from a codebook, wherein the codebook corresponds to the following three transmission properties for an uplink transmission: 1) all non-zero preceding elements from the precoding matrix have a same magnitude, 2) each precoding element from the precoding matrix is taken from a set of finite values and 3) there is only one non-zero element in any row of the precoding matrix, wherein the codebook for a rank-3 transmission corresponds to a set of four-by-three matrices with a first column having two non-zero elements, a second column having one non-zero element, a third column having one non-zero element, zero elements in all remaining element positions and contains at least a subset of the following matrices:

| $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ -1 & 0 & 0 \\ 0 & 1 & 0 \\ 0 & 0 & 1 \end{bmatrix}$ | | |
|---|---|---|---|
| | | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ |
| | | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ |

.

\* \* \* \* \*